(12) United States Patent
Yoshifusa et al.

(10) Patent No.: US 9,229,601 B2
(45) Date of Patent: Jan. 5, 2016

(54) TOUCH PANEL

(75) Inventors: Kazuyuki Yoshifusa, Tokyo (JP);
Koichi Kondoh, Tokyo (JP)

(73) Assignee: FUJITSU COMPONENT LIMITED, Tokyo (JP)

(*) Notice: Subject to any disclaimer, the term of this patent is extended or adjusted under 35 U.S.C. 154(b) by 226 days.

(21) Appl. No.: 13/456,365

(22) Filed: Apr. 26, 2012

(65) Prior Publication Data
US 2012/0285809 A1    Nov. 15, 2012

(30) Foreign Application Priority Data
May 12, 2011    (JP) .................... 2011-107337

(51) Int. Cl.
*G06F 3/045* (2006.01)
*G06F 3/041* (2006.01)

(52) U.S. Cl.
CPC .............. *G06F 3/045* (2013.01); *G06F 3/0416* (2013.01); *G06F 2203/04104* (2013.01); *G06F 2203/04113* (2013.01)

(58) Field of Classification Search
CPC combination set(s) only.
See application file for complete search history.

(56) References Cited

U.S. PATENT DOCUMENTS

| | | | |
|---|---|---|---|
| 5,815,141 A | 9/1998 | Phares | |
| 8,059,103 B2* | 11/2011 | Geaghan | 345/173 |
| 8,144,128 B2* | 3/2012 | Nakajima et al. | 345/173 |
| 8,599,565 B2* | 12/2013 | Kondoh et al. | 361/748 |
| 2010/0182277 A1* | 7/2010 | Nakajima et al. | 345/174 |
| 2010/0265198 A1* | 10/2010 | Kondoh et al. | 345/173 |
| 2011/0148808 A1* | 6/2011 | Sakurai et al. | 345/174 |
| 2011/0157061 A1* | 6/2011 | Kao et al. | 345/173 |
| 2011/0279406 A1* | 11/2011 | Kawaguchi et al. | 345/174 |
| 2012/0285809 A1* | 11/2012 | Yoshifusa et al. | 200/5 R |

FOREIGN PATENT DOCUMENTS

| | | |
|---|---|---|
| JP | 2004-272722 | 9/2004 |
| JP | 2008-293129 | 12/2008 |
| JP | 2010-256999 | 11/2010 |
| KR | 10-2010-0084986 | 7/2010 |
| WO | 02/069124 | 9/2002 |

* cited by examiner

*Primary Examiner* — Lun-Yi Lao
*Assistant Examiner* — Kelly B Hegarty
(74) *Attorney, Agent, or Firm* — IPUSA, PLLC

(57) ABSTRACT

A touch panel includes a first electrode substrate including a first substrate and a first conductive film formed on the first substrate, and a second electrode substrate including a second substrate and a second conductive film formed on the second substrate to face the first conductive film. A part or the entirety of the first conductive film is divided into plural conductive areas.

6 Claims, 21 Drawing Sheets

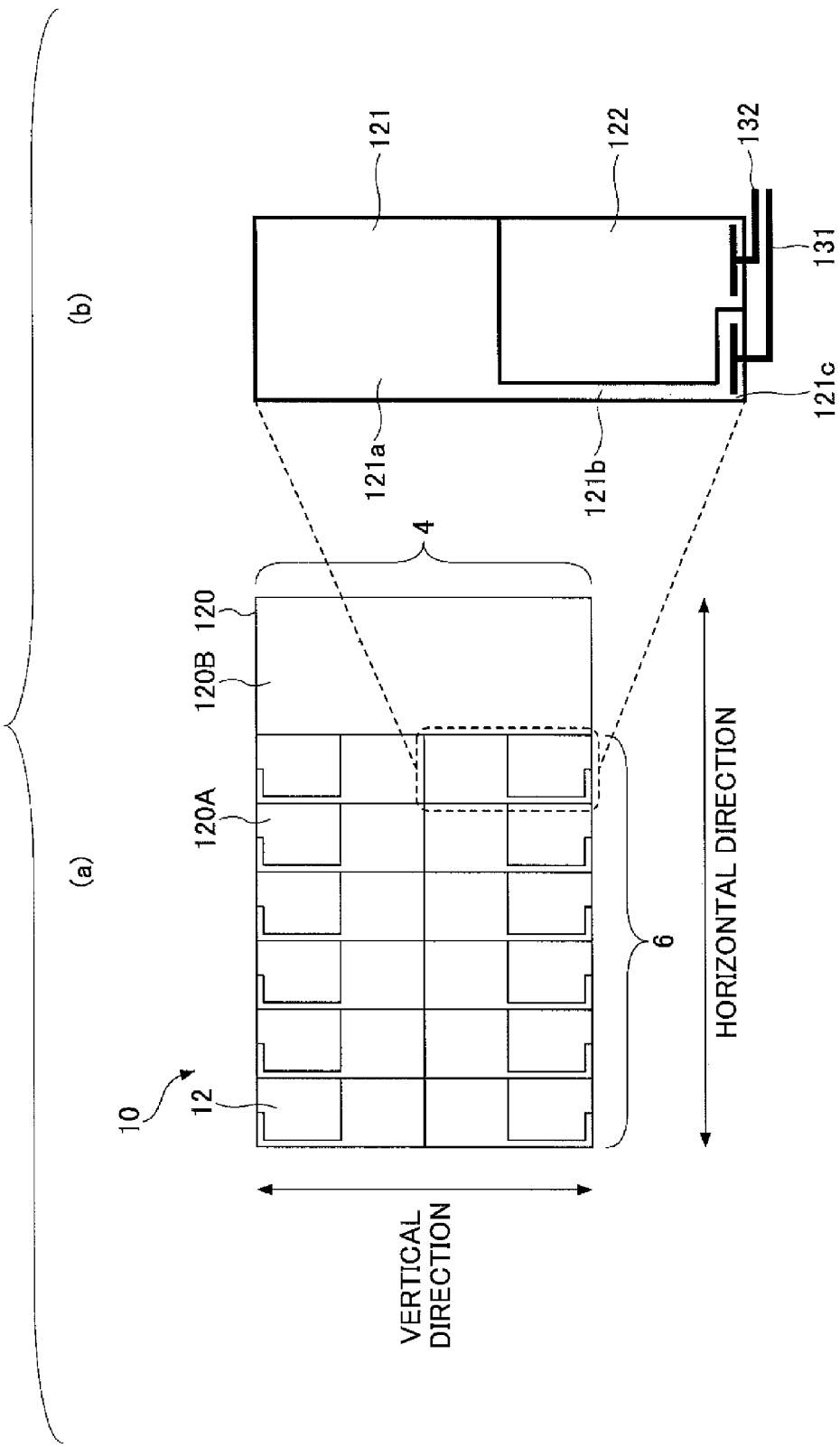

TOUCH PANEL

CROSS-REFERENCE TO RELATED APPLICATION

This application is based upon and claims the benefit of priority of Japanese Patent Application No. 2011-107337 filed on May 12, 2011, the entire contents of which are incorporated herein by reference.

FIELD

An aspect of this disclosure is related to a touch panel.

BACKGROUND

A touch panel is an input device that is provided on a surface of a display and allows the user to input instructions directly on the display. Touch panels are widely used for various purposes to allow the user to directly input instructions via a visual interface on a display.

A resistive touch panel is a type of touch panel that is widely used. A resistive touch panel includes an upper electrode substrate and a lower electrode substrate on which transparent conductive films are formed. The upper and lower electrode substrates are disposed such that the transparent conductive films face each other. When a point on the upper electrode substrate is pressed, the transparent conductive films contact each other at the pressed point and the position of the pressed point is thereby detected.

There are two types of resistive touch panels: a 4-wire touch panel and a 5-wire touch panel. In the 4-wire touch panel, X-axis electrodes are provided on one of the upper and lower electrode substrates and Y-axis electrodes are provided on the other one of the upper and lower electrode substrates. In the 5-wire touch panel, both X-axis electrodes and Y-axis electrodes are provided on the lower electrode substrate, and the upper electrode substrate functions as a probe for detecting a voltage (see, for example, Japanese Laid-Open Patent Publication No. 2004-272722 and Japanese Laid-Open Patent Publication No. 2008-293129).

An exemplary 5-wire touch panel is described below with reference to FIGS. 1 and 2. FIG. 1 is a perspective view of an exemplary 5-wire touch panel 200, and FIG. 2 is a cut-away side view of the 5-wire touch panel 200.

The 5-wire touch panel 200 includes a film 210, a transparent conductive film 230 formed on a surface of the film 210, a glass 220, and a transparent conductive film 240 formed on a surface of the glass 220. The film 210 and the transparent conductive film 230 constitute an upper electrode substrate, and the glass 220 and the transparent conductive 240 constitute a lower electrode substrate. The upper and lower electrode substrates are disposed such that the transparent conductive film 230 and the transparent conductive film 240 face each other via a spacer 250. The 5-wire touch panel 200 is electrically connected via a cable 260 to a host computer (not shown).

As illustrated in FIG. 3A, electrodes 241, 242, 243, and 244 are provided at the corresponding sides of the transparent conductive film 240. A voltage is applied alternately in the X-axis and Y-axis directions via the electrodes 241, 242, 243, and 244. When the transparent film 230 (or the film 210) is pressed at a contact point A, the transparent conductive film 230 and the transparent conductive film 240 contact each other at the contact point A. Then, as illustrated in FIG. 3B, a voltage Va is detected via the transparent conductive film 230, and the X and Y coordinates of the contact point A are detected.

Here, although the 5-wire touch panel 200 described above can detect the position of one contact point each time, it cannot detect the positions of plural contact points at the same time.

Assuming that the transparent conductive film 230 is pressed at contact points A and B at the same time, and the transparent conductive film 230 and the transparent conductive film 240 contact each other at the contact points A and B while a voltage is being applied alternately in the X-axis and Y-axis directions via the electrodes 241, 242, 243, and 244 (see FIG. 4A), the coordinates of a point that is not pressed and located between the contact points A and B are detected. This is because, as illustrated in FIG. 4B, only one voltage Vc is detected via the transparent conductive film 230 even when the transparent conductive film 230 and the transparent conductive film 240 contact each other at the contact points A and B.

SUMMARY

According to an aspect of this disclosure, there is provided a touch panel that includes a first electrode substrate including a first substrate and a first conductive film formed on the first substrate, and a second electrode substrate including a second substrate and a second conductive film formed on the second substrate to face the first conductive film. A part or the entirety of the first conductive film is divided into plural conductive areas.

BRIEF DESCRIPTION OF DRAWINGS

FIG. 9 is a drawing illustrating a transparent conductive film of an upper electrode substrate of the touch panel according to the first embodiment;

DESCRIPTION OF EMBODIMENTS

Preferred embodiments of the present invention are described below with reference to the accompanying drawings.

First Embodiment

A touch panel 100 according to a first embodiment is described below with reference to FIGS. 5 through 8.

Figure 7:
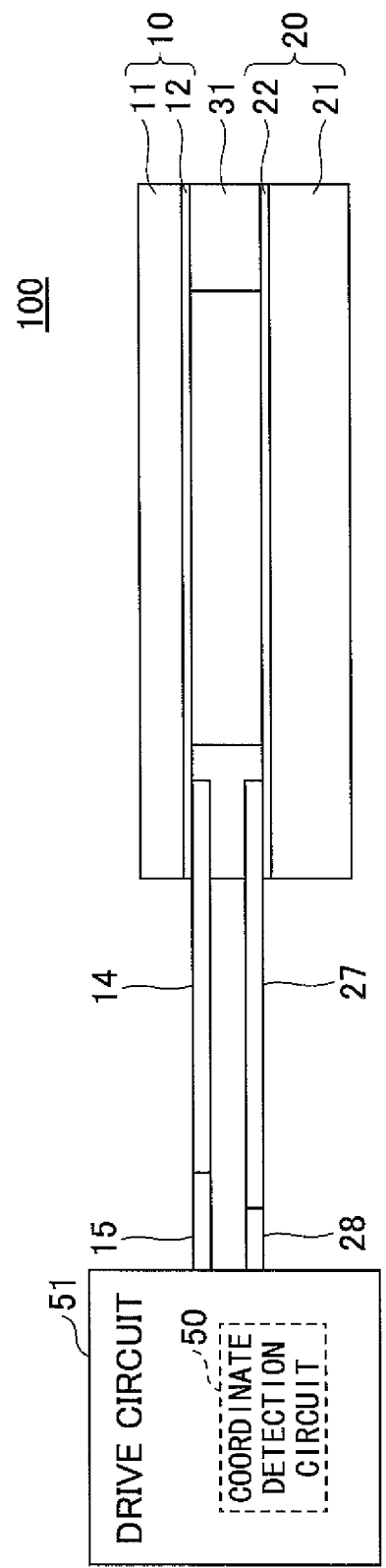
FIG. 7 is a cut-away side view of the touch panel according to the first embodiment.

As illustrated in FIG. 7, the touch panel 100 may include an upper electrode substrate 10 having a substantially-rectangular shape and including a film 11 and a transparent conductive film 12 formed on a surface of the film 11; and a lower electrode substrate 20 including a glass substrate 21 having substantially the same shape as the upper electrode substrate 10 and a transparent conductive film 22 formed on a surface of the glass substrate 21.

The touch panel 100 may also include a drive circuit 51 including a coordinate detection circuit 50. The drive circuit 51 of FIG. 7 including the coordinate detection circuit 50 is just an example. The touch panel 100 may include a drive circuit with any other appropriate configuration.

The upper electrode substrate 10 and the lower electrode substrate 20 are disposed such that the transparent conductive film 12 and the transparent conductive film 22 face each other, and are joined via a spacer 31 using an adhesive or a double sided tape.

Figure 1:
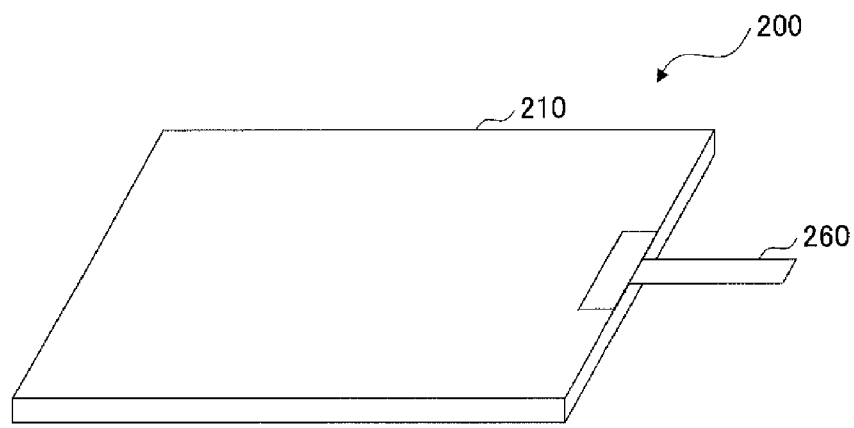
FIG. 1 is a perspective view of a related-art 5-wire touch panel.
Figure 2:
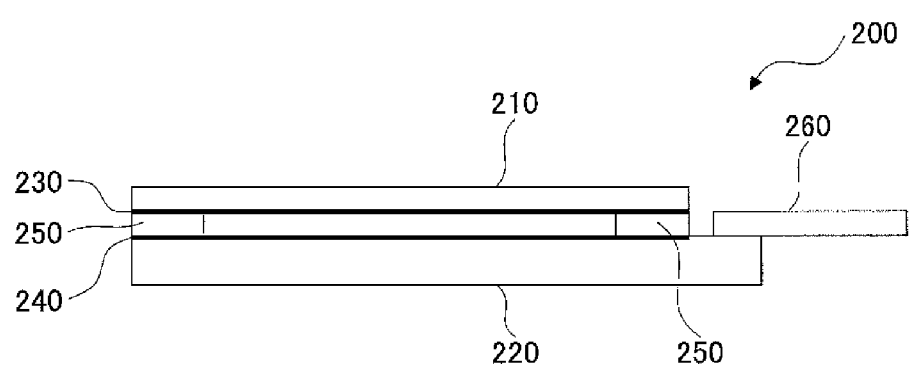
FIG. 2 is a cut-away side view of the related-art 5-wire touch panel of FIG. 1.
Figure 3B:
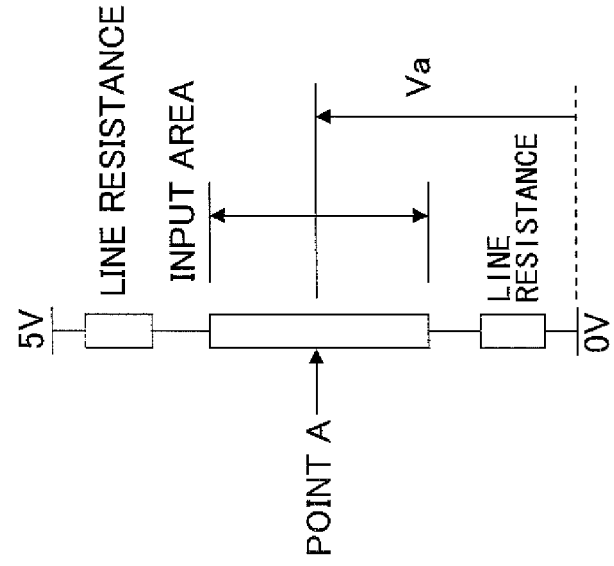
FIGS. 3A and 3B are drawings used to describe a coordinate detection method of the related-art 5-wire touch panel.
Figure 3A:
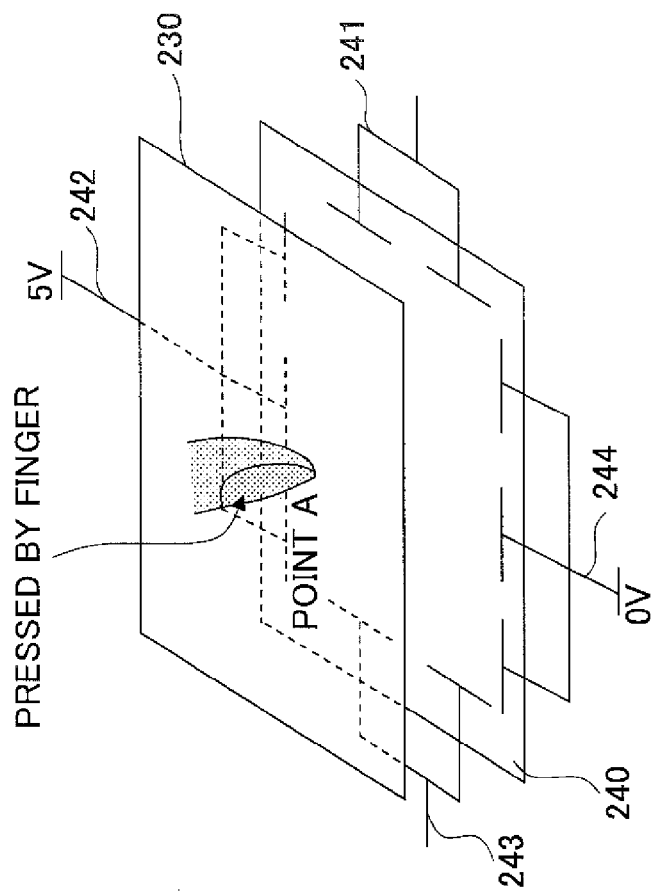
Figure 4B:
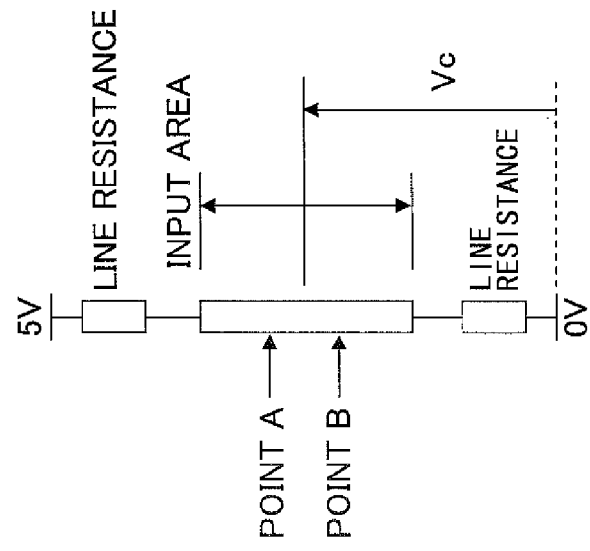
FIGS. 4A and 4B are drawings used to describe a coordinate detection method of the related-art 5-wire touch panel.
Figure 4A:
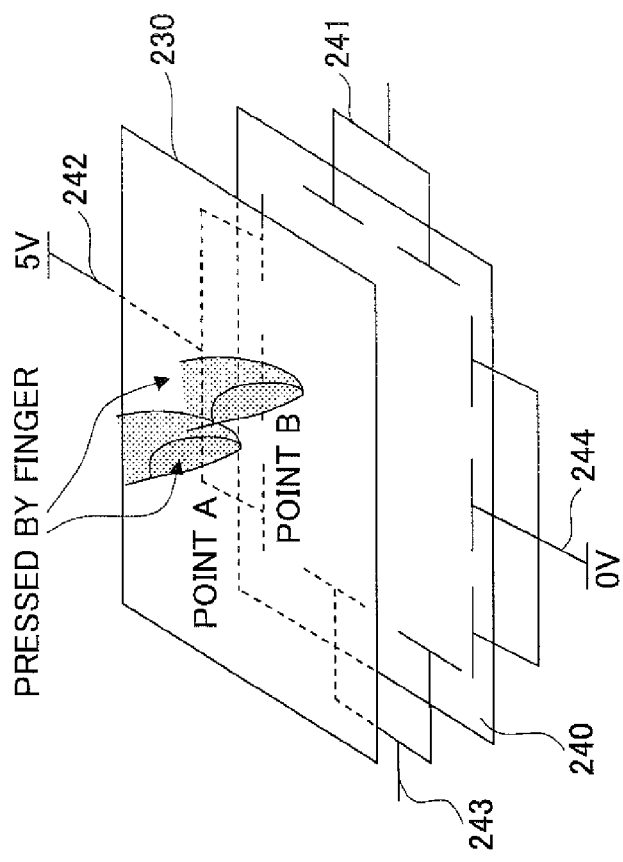
Figure 5:
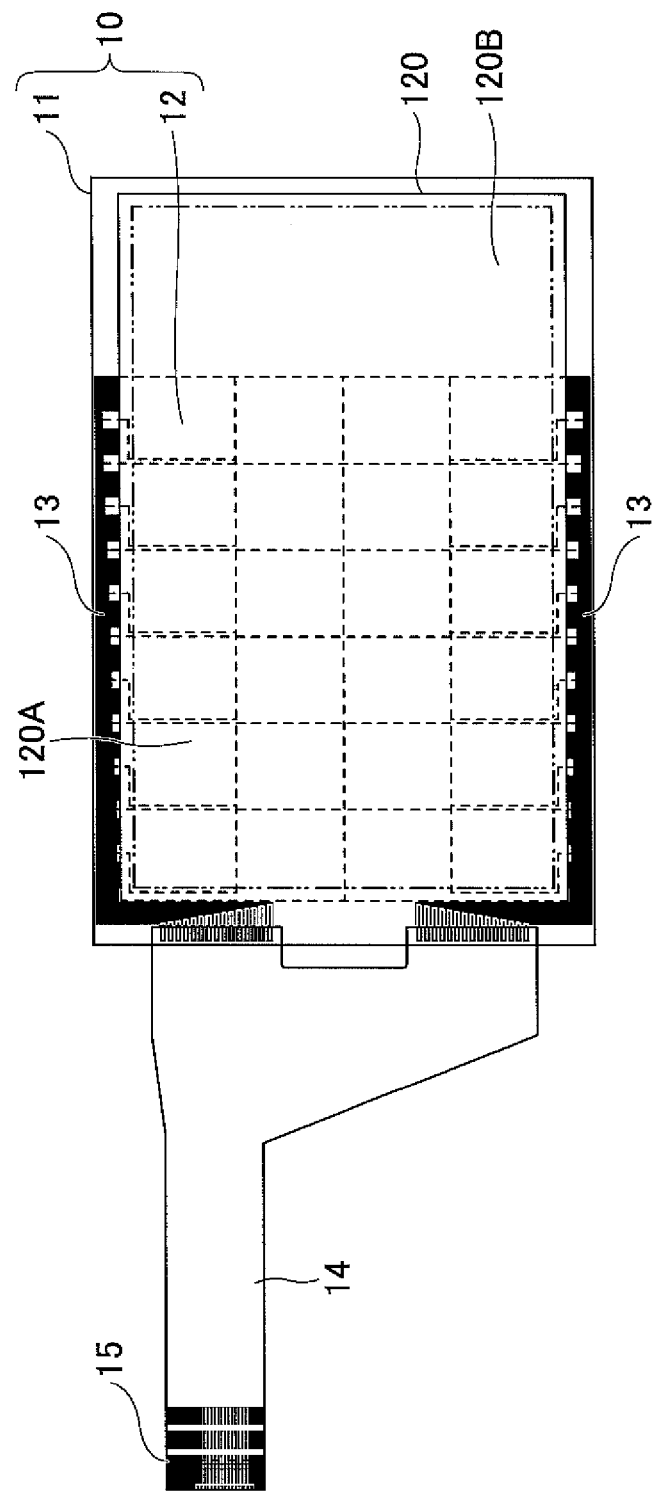
FIG. 5 is a drawing illustrating an exemplary configuration of an upper electrode substrate of a touch panel according to a first embodiment.

As illustrated in FIG. 5, an entire area 120 of the transparent conductive film 12 includes an area 120A constituting three fourths of the entire area 120 from the left, and an area 120B constituting one fourth of the entire area 120 from the right. The area 120A is divided into four areas arranged in the vertical direction (i.e., along the shorter side) and divided into six areas arranged in the horizontal direction (i.e., along the longer side) to form a total of 24 conductive areas. Meanwhile, the area 120B is not divided.

In FIG. 5, an area indicated by a dashed-two dotted line in the entire area 120 corresponds to a display area of a display such as a liquid-crystal panel to be placed below the touch panel 100.

The area 120A of the transparent conductive film 12 may be divided into the conductive areas by removing portions of the transparent conductive film 12 between the conductive areas. This configuration makes it possible to electrically insulate the conductive areas from each other. The conductive areas of the transparent conductive film 12 are connected to leading electrodes 13 provided at the ends in the vertical direction of the upper electrode substrate 10 (i.e., along the longer sides of the upper electrode substrate 10). The leading electrodes 13 extend along the sides of the upper electrode substrate 10 and are connected at one of the ends in the horizontal direction of the upper electrode substrate 10 (i.e., at one of the shorter sides of the upper electrode substrate 10) to an end of a flexible substrate 14. A terminal 15 is connected to the other end of the flexible substrate 14. As illustrated in FIG. 7, the terminal 15 is connected to the drive circuit 51 including the coordinate detection circuit 50.

Figure 6:
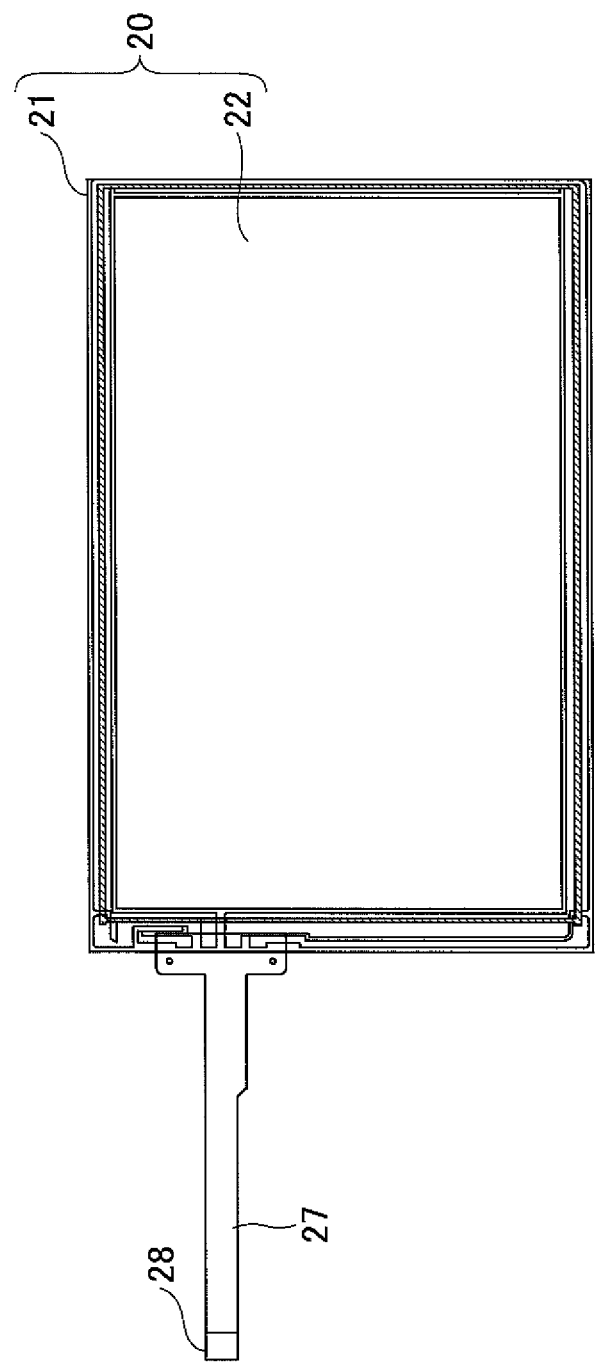
FIG. 6 is a drawing illustrating an exemplary configuration of a lower electrode substrate of the touch panel according to the first embodiment.
Figure 8:
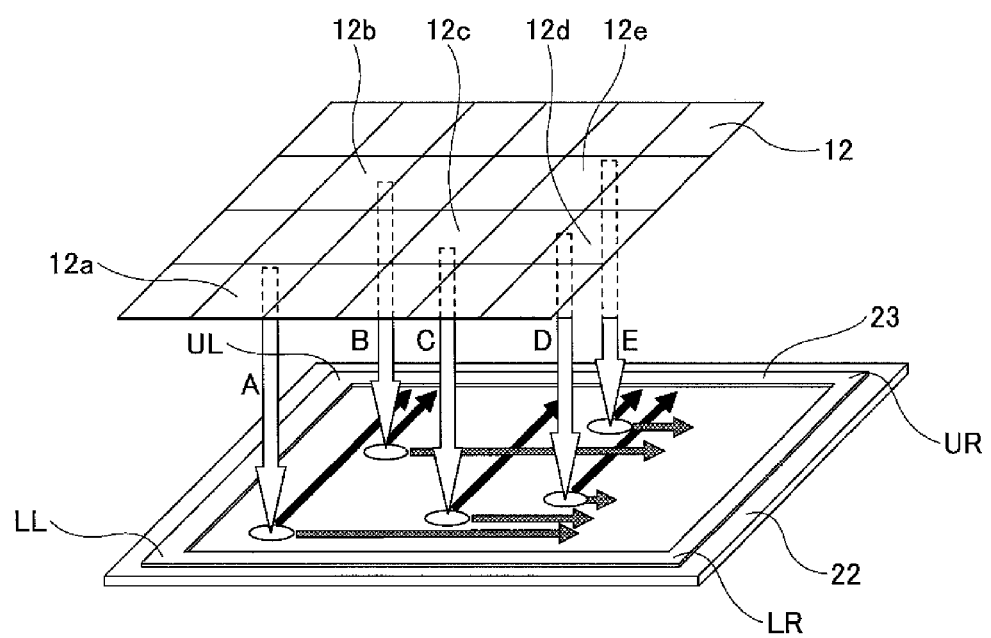
FIG. 8 is a drawing illustrating transparent conductive films of the touch panel according to the first embodiment.

As illustrated in FIG. 8, an electrode 23 shaped like a rectangular ring is formed on the transparent conductive film 22 along the four edges of the lower electrode substrate 20 (i.e., on the four edges on the transparent conductive film 22). The electrode 23 may be implemented, for example, by a resistive film including Ag or Ag—C. Leads are connected to corners LL, LR, UL, and UR of the electrode 23 to control the electric potentials of the corners LL, LR, UL, and UR (or to generate an electric potential distribution on the transparent conductive film 22). Referring to FIG. 6, the leads extend from the corners LL, LR, UL, and UR along the edges of the lower electrode substrate 20, and are connected at one of the ends in the horizontal direction of the lower electrode substrate 20 (i.e., at one of the shorter sides of the lower electrode substrate 20) to an end of a flexible substrate 27. A terminal 28 is connected to the other end of the flexible substrate 27.

The terminal 15 of the flexible substrate 14 and the terminal 28 of the flexible substrate 27 are connected to the drive circuit 51 that is connected, for example, to a host computer not shown. Examples of materials of the transparent conductive film 12 and the transparent conductive film 22 include indium tin oxide (ITO), a material obtained by adding Al or Ga to zinc oxide (ZnO), and a material obtained by adding Sb to tin oxide ($SnO_2$).

Examples of materials of the film 11 include polyethylene terephthalate (PET), polycarbonate (PC), and a resin material that is transparent in the visible range. The glass substrate 21 may be replaced with a resin substrate.

With the configuration of the touch panel 100 of the first embodiment, when a point on the upper electrode substrate 10 is pressed, for example, by a finger, the transparent conductive film 12 of the upper electrode substrate 10 and the transparent conductive film 22 of the lower electrode substrate 20 contact each other at a contact point corresponding to the pressed point. Then, a voltage at the contact point is detected to identify the position of the contact point, i.e., the position of the pressed point on the upper electrode substrate 10. More specifically, according to the first embodiment, the conductive areas of the transparent conductive film 12 are scanned in a time division manner so that one of the conductive areas including the contact point can be identified based on the timing when the transparent conductive film 12 and the transparent conductive film 22 contact each other.

Also according to the first embodiment, voltages applied by the drive circuit 51 to the corners LL, LR, UL, and UR of the electrode 23 formed on the transparent conductive film 22 are controlled such that voltages are applied alternately in the X-axis and Y-axis directions.

With the configuration where the transparent conductive film 12 of the upper electrode substrate 10 is divided into the conductive areas, the coordinate detection circuit 50 can separately detect the positions of multiple contact points, where the upper electrode substrate 10 and the lower electrode substrate 20 contact each other, in the respective conductive areas.

In the example of FIG. 8, the transparent conductive film 12 of the upper electrode substrate 10 and the transparent conductive film 22 of the lower electrode substrate 20 contact each other at contact points A, B, C, D, and E indicated by arrows A, B, C, D, and E. The contact points A through E are in different conductive areas of the transparent conductive film 12 and therefore can be separately detected. More specifically, in FIG. 8, the contact point A is in a conductive area 12a of the transparent conductive film 12, the contact point B is in a conductive area 12b of the transparent conductive film 12, the contact point C is in a conductive area 12c of the transparent conductive film 12, the contact point D is in a conductive area 12d of the transparent conductive film 12, and the contact point E is in a conductive area 12e of the transparent conductive film 12. Since the conductive areas 12a, 12b, 12c, 12d, and 12e are electrically insulated from each other, the contact points A through E can be separately detected.

Thus, the first embodiment makes it possible to separately detect multiple contact points (in this example, five contact points) between the transparent conductive film 12 and the transparent conductive film 22 (or between the upper electrode substrate 10 and the lower electrode substrate 20).

In other words, the first embodiment makes it possible to identify conductive areas including contact points between the transparent conductive film 12 and the transparent conductive film 22, and also makes it possible to more accurately detect the coordinates of the contact points based on the electric potential distribution of the transparent conductive film 22. Further, the first embodiment makes it possible to detect movement of (or changes in the positions of) contact points between the transparent conductive film 12 and the transparent conductive film 22, and makes it possible to detect the coordinates of the moved contact points based on the electric potential distribution of the transparent conductive film 22.

Next, the conductive areas of the transparent conductive film 12 of the upper electrode substrate 10 are described in more detail. As illustrated by FIG. 9 (a), the entire area 120 of the transparent conductive film 12 includes the area 120A constituting three fourths of the entire area 120 from the left and the area 120B constituting one fourth of the entire area 120 from the right. The area 120A is divided into four areas arranged in the vertical direction (i.e., along the shorter side) and divided into six areas arranged in the horizontal direction (i.e., along the longer side) to form a total of 24 conductive areas. Meanwhile, the area 120B is not divided.

The conductive areas are separated into two groups: upper two rows (upper conductive areas) and lower two rows (lower conductive areas). The upper conductive areas are connected to the leading electrodes 13 at the upper end (i.e., one of the ends in the vertical direction) of the upper electrode substrate 10, and the lower conductive areas are connected to the leading electrodes 13 at the lower end (i.e., the other one of the ends in the vertical direction) of the upper electrode substrate 10. In the first embodiment, it is assumed that the touch panel 100 is operated with a finger(s). For this reason, each of the conductive areas has a rectangular or square shape. The length of a longer side or a side of the largest one of the conductive areas is preferably less than or equal to 25 mm, and more preferably less than or equal to 20 mm. These lengths are based on a typical size of a finger. If the length of a side of each conductive area is less than the distance between finger tips touching multiple contact points on the upper electrode substrate 10, it is possible to separately detect the positions of the contact points. Thus, the length of a side of a conductive area may be determined, for example, based on a typical distance between finger tips of a person and comfortable operation of a touch panel. Meanwhile, as the size of the conductive areas decreases, the proportion of extension parts (described later) with respect to the entire conductive areas increases. Therefore, if the size of the conductive areas is too small, the performance of the touch panel may be reduced. For this reason, the length of a shorter side or a side of the smallest one of the conductive areas is preferably greater than or equal to 5 mm, and more preferably greater than or equal to 7 mm.

The conductive areas of the transparent conductive film 12 are formed by removing portions of the transparent conductive film 12 around the respective conductive areas. This configuration makes it possible to electrically insulate the conductive areas from each other.

Portions of the transparent conductive film 12 around the respective conductive areas may be removed, for example, by one of the following methods: illuminating portions of the transparent conductive film 12 with a laser beam and removing the illuminated portions by heating or ablation; applying a photo resist on the transparent conductive film 12, exposing and developing the photoresist with an exposing device to form a resist pattern on areas corresponding to the conductive areas, and removing portions of the transparent conductive film 12 not covered with the resist pattern by dry or wet etching; and printing a pattern of an etching paste on portions of the transparent conductive film 12 to be removed. Among these methods, the method of removing portions of the transparent conductive film 12 by illumination with a laser beam is preferably used.

The width of the portions of the transparent conductive film 12 to be removed to form the conductive areas is preferably less than or equal to 1 mm. An increase in the width of the removed portions of the transparent conductive film 12 indicates an increase in areas where an input operation cannot be detected. Therefore, if the width of the removed portions is too large, the performance of the touch panel may be reduced. Assuming that the touch panel 100 is operated using a finger or a pen whose tip has a radius of about 0.8 mm, the width of the removed portions of the transparent conductive film 12 is preferably less than or equal to 1 mm to maintain the performance of the touch panel 100. In the first embodiment, to improve the visibility and performance of the touch panel 100, the width of the removed portions of the transparent conductive film 12 is set at, for example, about 100 μm.

Each pair of vertically adjacent conductive areas in the lower two rows forms a pattern as illustrated by FIG. 9 (b), and each pair of vertically adjacent conductive areas in the upper two rows forms a pattern that is obtained by inverting the pattern formed by a pair of vertically adjacent conductive areas in the lower two rows. In other words, six columns of similar patterns are arranged in the horizontal direction in the transparent conductive film 12 of the upper electrode substrate 10.

FIG. 9 (b) represents an exemplary configuration of a pattern formed by conductive areas 121 and 122 in the lower two rows. Other patterns formed by pairs of vertically adjacent conductive areas may have substantially the same configuration. The conductive area 122 is adjacent to one of the longer sides of the upper electrode substrate 10, and the conductive area 121 is adjacent to none of the longer sides of the upper electrode substrate 10. For this reason, the conductive area 121 includes an extension part 121b extending from a main part 121a to a longer side of the upper electrode substrate 10 and a connection part 121c adjacent to the longer side. The extension part 121b is formed between two horizontally adjacent conductive areas that are adjacent to the longer side of the upper electrode substrate 10. More specifically, the extension part 121b is formed between the conductive area 122 and a conductive area that is adjacent to the conductive area 122 as well as the longer side of the upper electrode substrate 10. Accordingly, the extension part 121b is formed using an area that is originally a part of the conductive area 122. Therefore, to prevent an error in detecting a contact point, the width of the extension part 121b is preferably as small as possible.

With the above configuration, the conductive area 121 (or the main part 121a) can be connected via the extension part 121b and the connection part 121c to a leading electrode 131, and the conductive area 122 can be connected to a leading electrode 132 near the longer side of the upper electrode substrate 10.

The connection part 121c of the conductive area 121 may be connected to the leading electrode 131 using a silver paste. Similarly, an edge of the conductive area 122 near the longer side of the upper electrode substrate 10 may be connected to the leading electrode 132 using a silver paste. The leading electrodes 13 illustrated in FIG. 5 represent a collection of leading electrodes 131 and 132.

As described above, in the touch panel 100 of the first embodiment, the area 120A constituting the left three fourths of the entire area 120 of the transparent conductive film 12 is divided into four areas arranged in the vertical direction (i.e., along the shorter side) and divided into six areas arranged in the horizontal direction (i.e., along the longer side) to form a total of 24 conductive areas; and the area 120B constituting the right one fourth of the entire area 120 of the transparent conductive film 12 is not divided.

In other words, the transparent conductive film 12 includes 25 conductive areas consisting of the 24 divided areas of the area 120A and the area 120B.

The 25 conductive areas of the transparent conductive film 12 are scanned in a time division manner so that one of the 25 conductive areas including a contact point can be identified based on the timing of contact.

For example, the 25 conductive areas of the transparent conductive film 12 illustrated in FIG. 9 are selected and scanned in sequence in a time division manner. This configuration makes it possible to identify one of the 25 conductive areas including a contact point and to detect the coordinates of the contact point.

This configuration also makes it possible to separately detect the positions of multiple contact points, where the upper electrode substrate 10 and the lower electrode substrate 20 contact each other, in respective conductive areas of the transparent conductive film 12.

In other words, the above configuration makes it possible to separately detect multiple points on the upper electrode substrate 10 that are touched or pressed by the user at the same time.

The touch panel 100 of the first embodiment may be used, for example, for a mobile terminal such as a smartphone. In this case, a display such as a liquid crystal panel may be placed below the divided area 120A and the non-divided area 120B.

For example, data (e.g., a contact list and pictures) stored in a memory of the mobile terminal or data downloaded from a network may be displayed in the divided area 120A, and a graphical user interface (GUI) such as buttons may be displayed in the non-divided area 120B.

When browsing data (e.g., a contact list and pictures) stored in a memory of the mobile terminal or data downloaded from a network, it is convenient for the user if the data can be scrolled and zoomed.

Therefore, it is preferable to display such data in the divided area 120A where multiple contact points can be separately detected to allow the user to scroll and zoom the data.

Meanwhile, GUI buttons may be displayed in the non-divided area 120B to accept user operations that do not require touching multiple points at the same time.

Thus, even if the area 120B is not divided, it possible to implement a user-friendly touch panel by using the area 120A and the area 120B for suitable purposes.

Second Embodiment

A touch panel according to a second embodiment is different from the touch panel 100 of the first embodiment in that instead of a transparent conductive film of an upper electrode substrate, a transparent conductive film of a lower electrode substrate is divided into conductive areas.

Figures 10A, 10B:
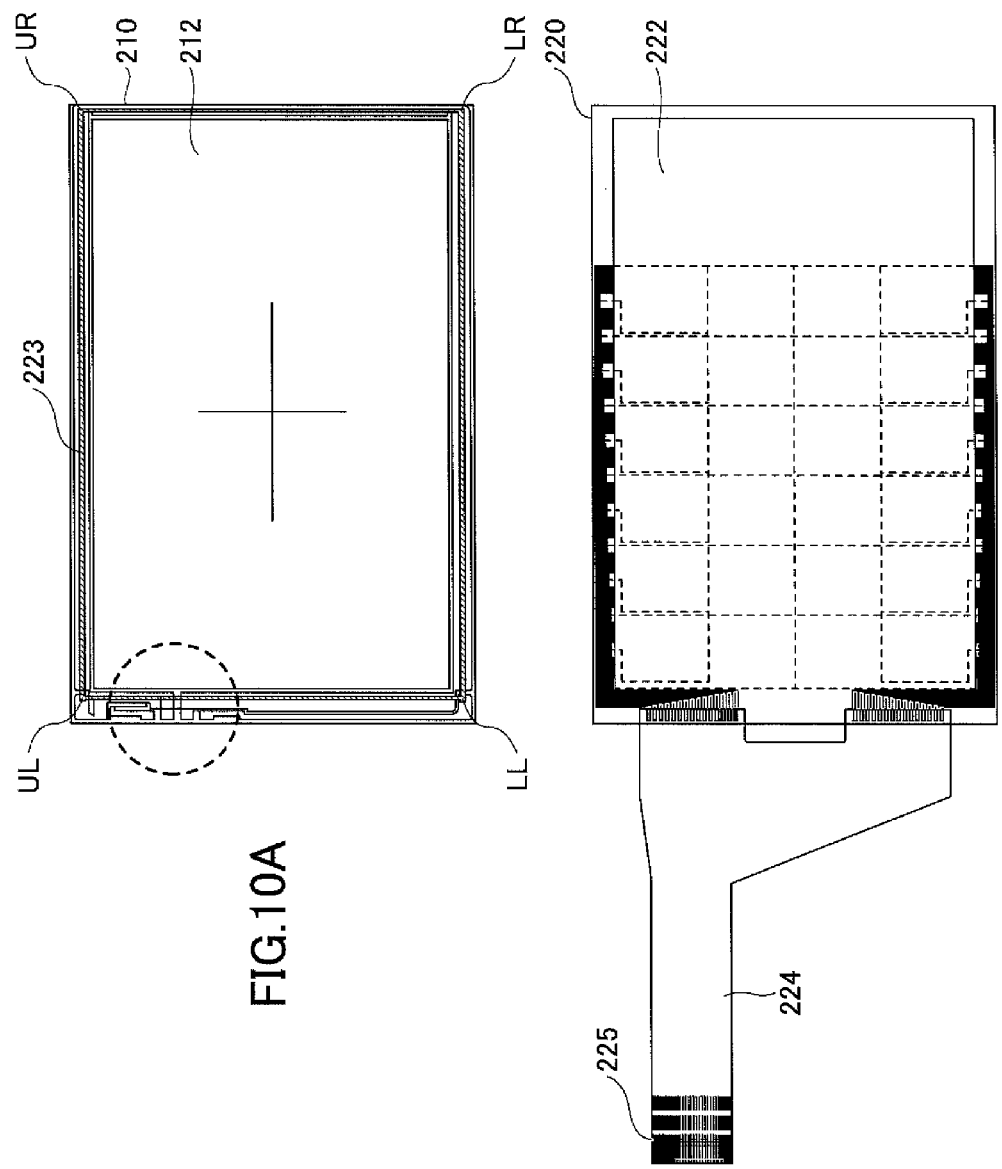
FIGS. 10A and 10B are drawings illustrating an upper electrode substrate and a lower electrode substrate of a touch panel according to a second embodiment.

FIGS. 10A and 10B are drawings illustrating an upper electrode substrate 210 and a lower electrode substrate 220 of the touch panel according to the second embodiment.

As illustrated in FIG. 10A, a transparent conductive film 212 of the upper electrode substrate 210 is not divided. Instead, an electrode 223 shaped like a rectangular ring is formed on the transparent conductive film 212 along the four edges of the upper electrode substrate 210 (i.e., on the four edges on the transparent conductive film 212). The electrode 223 may be implemented, for example, by a resistive film including Ag or Ag—C. Leads are connected to corners LL, LR, UL, and UR of the electrode 223 to control the electric potentials of the corners LL, LR, UL, and UR (or to generate an electric potential distribution on the transparent conductive film 212).

As illustrated in FIG. 10B, similarly to the transparent conductive film 12 of the upper electrode substrate 10 of the first embodiment, a transparent conductive film 222 of the lower electrode substrate 220 is divided into 25 conductive areas.

The 25 conductive areas of the transparent conductive film 222 are connected via wiring around the lower electrode substrate 220 to an end of a flexible substrate 224 at one of the ends in the horizontal direction of the lower electrode substrate 220 (i.e., at one of the shorter sides of the lower electrode substrate 220). A terminal 225 is connected to the other end of the flexible substrate 224.

Similarly to the touch panel 100 of the first embodiment, the touch panel of the second embodiment can detect a contact point in each of the 25 conductive areas. Also, the touch panel of the second embodiment makes it possible to separately detect the positions of multiple contact points in respective conductive areas even when the touch panel is touched at multiple points at the same time.

Thus, similarly to the first embodiment, the second embodiment makes it possible to provide a user-friendly touch panel.

Third Embodiment

A touch panel according to a third embodiment is different from the touch panel 100 of the first embodiment in the manner in which a transparent conductive film of an upper electrode substrate is divided.

Figure 11:
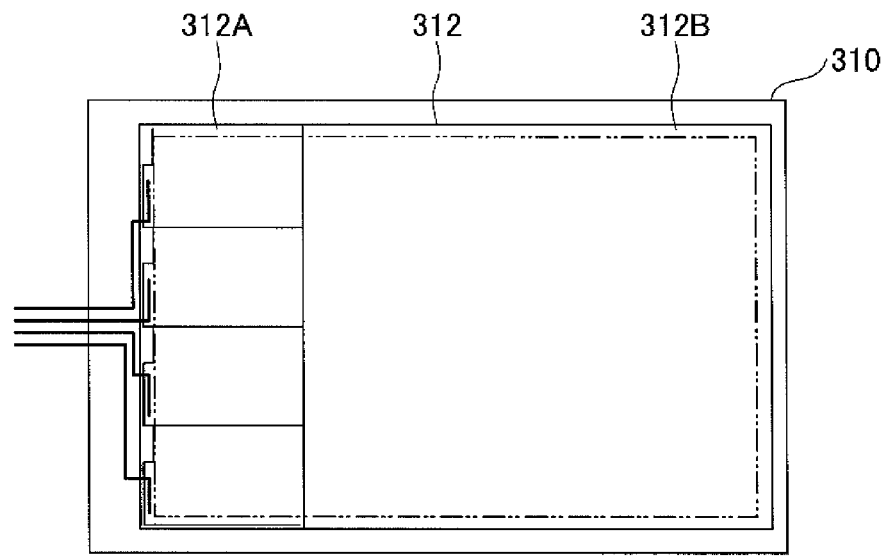
FIG. 11 is a drawing illustrating an upper electrode substrate of a touch panel according to a third embodiment.

FIG. 11 is a drawing illustrating an upper electrode substrate 310 of the touch panel according to the third embodiment.

A transparent conductive film 312 of the upper electrode substrate 310 includes an area 312A constituting one fourth of the transparent conductive film 312 from the left and an area 312B constituting three fourths of the transparent conductive film 312 from the right. The area 312A is divided into four conductive areas that are arranged along the shorter side. The area 311B is not divided.

The upper electrode substrate 310 of the third embodiment is disposed to face the lower electrode substrate 20 (see FIG. 6) of the first embodiment.

The 5 conductive areas consisting of the four divided areas of the area 312A and the non-divided area 312B are selected and scanned in sequence in a time division manner. This configuration makes it possible to identify one of the 5 conductive areas including a contact point, and to detect the coordinates of that contact point.

This configuration also makes it possible to separately detect the positions of multiple contact points, where the upper electrode substrate 310 and the lower electrode substrate 20 contact each other, in respective conductive areas.

In other words, the configuration of the third embodiment makes it possible to separately detect multiple points on the upper electrode substrate 310 that are touched or pressed by the user at the same time.

The touch panel of the third embodiment may be used, for example, for a mobile terminal such as a smartphone. In this case, a display such as a liquid crystal panel may be placed below the divided area 312A and the non-divided area 312B. For example, data (e.g., a contact list and pictures) stored in a memory of the mobile terminal or data downloaded from a network may be displayed in the divided area 312A, and a graphical user interface (GUI) such as buttons may be displayed in the non-divided area 312B.

Thus, even if the area 312B is not divided, it possible to implement a user-friendly touch panel by using the area 312A and the area 312B for suitable purposes.

Fourth Embodiment

A touch panel according to a fourth embodiment is different from the touch panel 100 of the first embodiment in the manner in which a transparent conductive film of an upper electrode substrate is divided.

Figure 12:
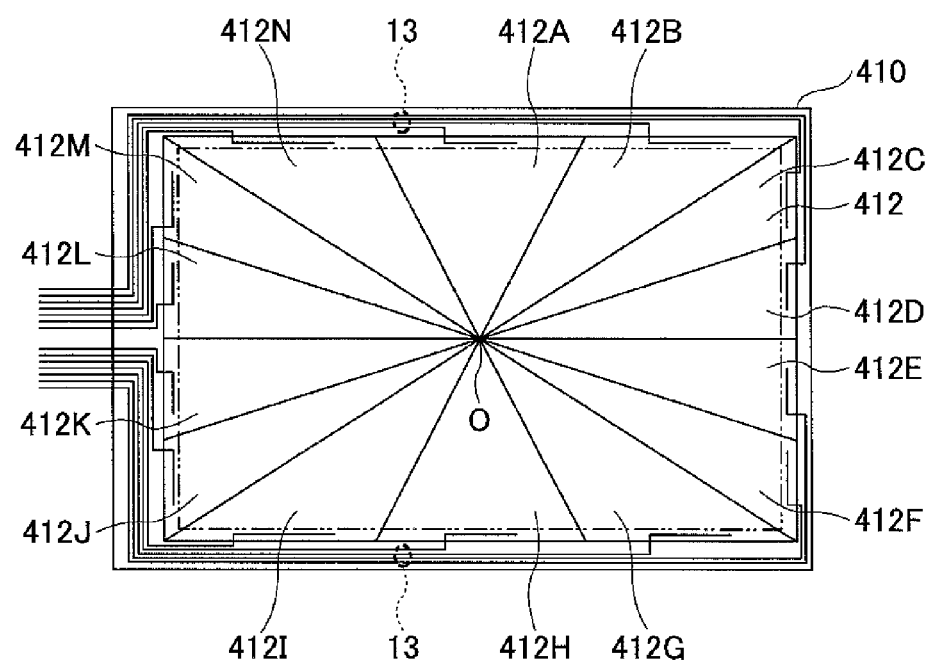
FIG. 12 is a drawing illustrating an upper electrode substrate of a touch panel according to a fourth embodiment.

FIG. 12 is a drawing illustrating an upper electrode substrate 410 of the touch panel according to the fourth embodiment.

A transparent conductive film 412 of the upper electrode substrate 410 of the fourth embodiment is divided into 14 areas 412A through 412N that radiate from a center O of the transparent conductive film 412. The areas 412A through 412N are connected via the leading electrodes 13 to the flexible substrate 14 and the terminal 15 (see FIG. 5).

In the fourth embodiment, the transparent conductive film 412 is divided into the areas 412A through 412N radiating from the center O based on an assumption that the probability that a multi-touch input operation (an operation performed by touching multiple points at the same time) is performed is higher in an area around the center than in the periphery of the touch panel.

The upper electrode substrate 410 of the fourth embodiment is disposed to face the lower electrode substrate 20 (see FIG. 6) of the first embodiment.

The areas 412A through 412N are selected and scanned in sequence in a time division manner. This configuration makes it possible to identify one of the areas 412A through 412N including a contact point and to detect the coordinates of the contact point.

This configuration also makes it possible to separately detect the positions of multiple contact points, where the upper electrode substrate 410 and the lower electrode substrate 20 contact each other, in the respective conductive areas 412A through 412N of the transparent conductive film 412.

In other words, the configuration of the fourth embodiment makes it possible to separately detect multiple points on the upper electrode substrate 410 that are touched or pressed by the user at the same time.

The touch panel of the fourth embodiment may be used, for example, for a mobile terminal such as a smartphone. In this case, a display such as a liquid crystal panel may be placed below the areas 412A through 412N. For example, data (e.g., a contact list and pictures) stored in a memory of the mobile terminal or data downloaded from a network may be displayed in the areas 412A through 412N. This configuration makes it possible to provide a user-friendly touch panel that can separately detect multiple points touched by the user.

Further, the configuration of the touch panel of the fourth embodiment makes it possible to reduce the number of areas into which the transparent conductive film 412 is divided, and thereby makes it possible to simplify the production process.

Fifth Embodiment

A touch panel according to a fifth embodiment is different from the touch panel of the fourth embodiment in the manner in which a transparent conductive film of an upper electrode substrate is divided.

Figure 13:
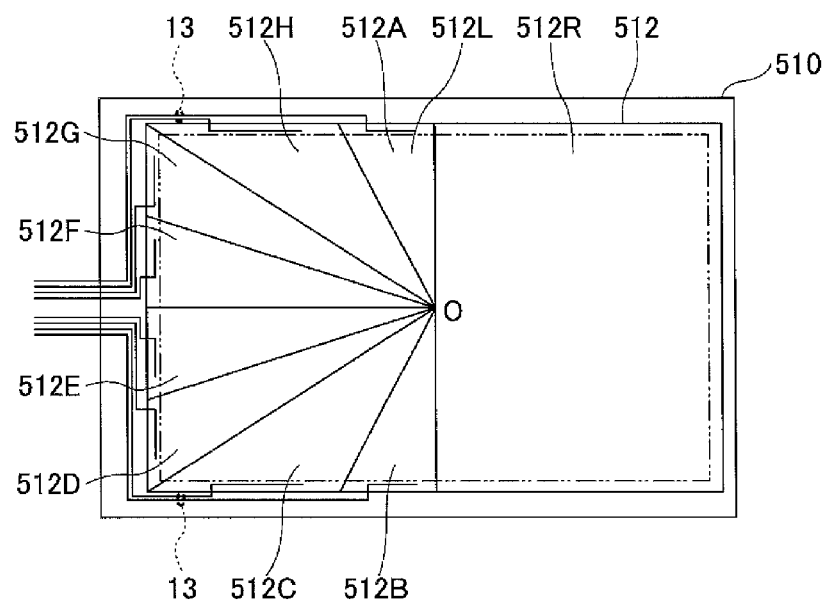
FIG. 13 is a drawing illustrating an upper electrode substrate of a touch panel according to a fifth embodiment.

FIG. 13 is a drawing illustrating an upper electrode substrate 510 of the touch panel according to the fifth embodiment.

A transparent conductive film 512 of the upper electrode substrate 510 of the fifth embodiment includes a left-half area 512L and a right-half area 512R. The area 512L is divided into 8 areas 512A through 512H that radiate from a center O of the transparent conductive film 512. Meanwhile, the area 512R is not divided. Thus, the transparent conductive film 512 includes 9 conductive areas consisting of the areas 512A through 512H and the area 512R.

The areas 512A through 512H and the area 512R are connected via the leading electrodes 13 to the flexible substrate 14 and the terminal 15 (see FIG. 5).

The upper electrode substrate 510 of the fifth embodiment is disposed to face the lower electrode substrate 20 (see FIG. 6) of the first embodiment.

The areas 512A through 512H and the area 512R are selected and scanned in sequence in a time division manner. This configuration makes it possible to identify one of the 512A through 512H and the area 512R including a contact point and to detect the coordinates of the contact point.

This configuration also makes it possible to separately detect the positions of multiple contact points, where the upper electrode substrate 510 and the lower electrode substrate 20 contact each other, in the respective conductive areas 512A through 512H and the area 512R of the transparent conductive film 512.

In other words, the configuration of the fifth embodiment makes it possible to separately detect multiple points on the upper electrode substrate 510 that are touched or pressed by the user at the same time.

The touch panel of the fifth embodiment may be used, for example, for a mobile terminal such as a smartphone. In this case, a display such as a liquid crystal panel may be placed below the divided area 512L and the non-divided area 512R. For example, data (e.g., a contact list and pictures) stored in a memory of the mobile terminal or data downloaded from a network may be displayed in the divided area 512L, and a graphical user interface (GUI) such as buttons may be displayed in the non-divided area 512R.

Thus, even if the area 512R is not divided, it possible to implement a user-friendly touch panel by using the area 512L and the area 512R for suitable purposes.

Further, the configuration of the touch panel of the fifth embodiment makes it possible to reduce the number of areas into which the transparent conductive film 512 is divided, and thereby makes it possible to simplify the production process.

Sixth Embodiment

A touch panel according to a sixth embodiment is different from the touch panel of the fourth embodiment in the manner in which a transparent conductive film of an upper electrode substrate is divided.

Figure 14:
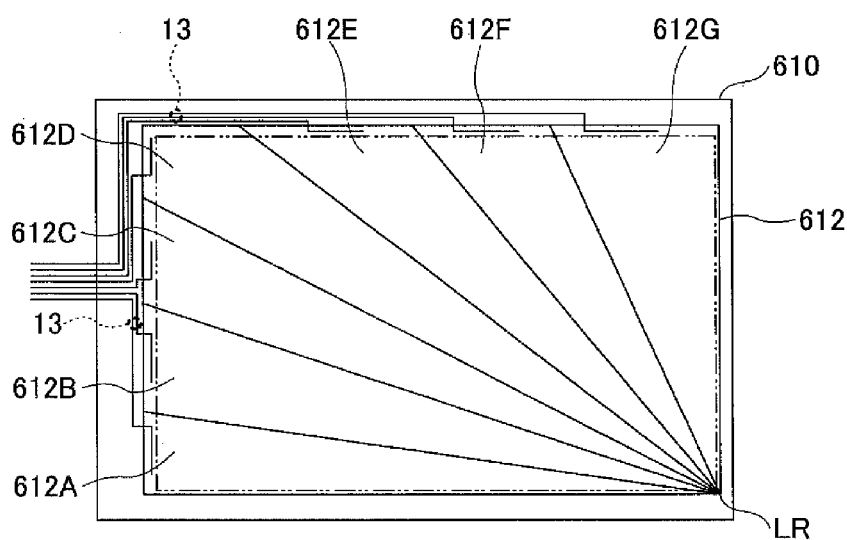
FIG. 14 is a drawing illustrating an upper electrode substrate of a touch panel according to a sixth embodiment.

FIG. 14 is a drawing illustrating an upper electrode substrate 610 of the touch panel according to the sixth embodiment.

A transparent conductive film 612 of the upper electrode substrate 612 of the sixth embodiment is divided into 7 areas 612A through 612G that radiate from one of the corners (in this example, a corner LR) of the transparent conductive film 612. The areas 612A through 612G are connected via the leading electrodes 13 to the flexible substrate 14 and the terminal 15 (see FIG. 5).

Since the transparent conductive film 612 is divided into the areas 612A through 612G that radiate from a corner (e.g., LR) of the transparent conductive film 612, the touch panel of the sixth embodiment is suitable for use where a multi-touch input operation is performed in an area near the corner. In the example of FIG. 14, the transparent conductive film 612 is divided into the areas 612A through 612G radiating from the corner LR (lower-right corner). However, depending on the purpose, the transparent conductive film 612 may be divided into areas that radiate from any other corner.

The upper electrode substrate 610 of the sixth embodiment is disposed to face the lower electrode substrate 20 (see FIG. 6) of the first embodiment.

The areas 612A through 612G are selected and scanned in sequence in a time division manner. This configuration makes it possible to identify one of the areas 612A through 612G including a contact point and to detect the coordinates of the contact point.

This configuration also makes it possible to separately detect the positions of multiple contact points, where the upper electrode substrate 610 and the lower electrode substrate 20 contact each other, in the respective conductive areas 612A through 612G of the transparent conductive film 612.

In other words, the configuration of the sixth embodiment makes it possible to separately detect multiple points on the upper electrode substrate 410 that are touched or pressed by the user at the same time.

The touch panel of the sixth embodiment may be used, for example, for a mobile terminal such as a smartphone. In this case, a display such as a liquid crystal panel may be placed below the areas 612A through 612G. For example, data (e.g., a contact list and pictures) stored in a memory of the mobile terminal or data downloaded from a network may be displayed in the areas 612A through 612G. This configuration makes it possible to provide a user-friendly touch panel that can separately detect multiple points touched by the user.

Further, the configuration of the touch panel of the sixth embodiment makes it possible to reduce the number of areas into which the transparent conductive film 612 is divided, and thereby makes it possible to simplify the production process.

Seventh Embodiment

A touch panel according to a seventh embodiment is different from the touch panel of the fourth embodiment in the manner in which a transparent conductive film of an upper electrode substrate is divided.

Figure 15:
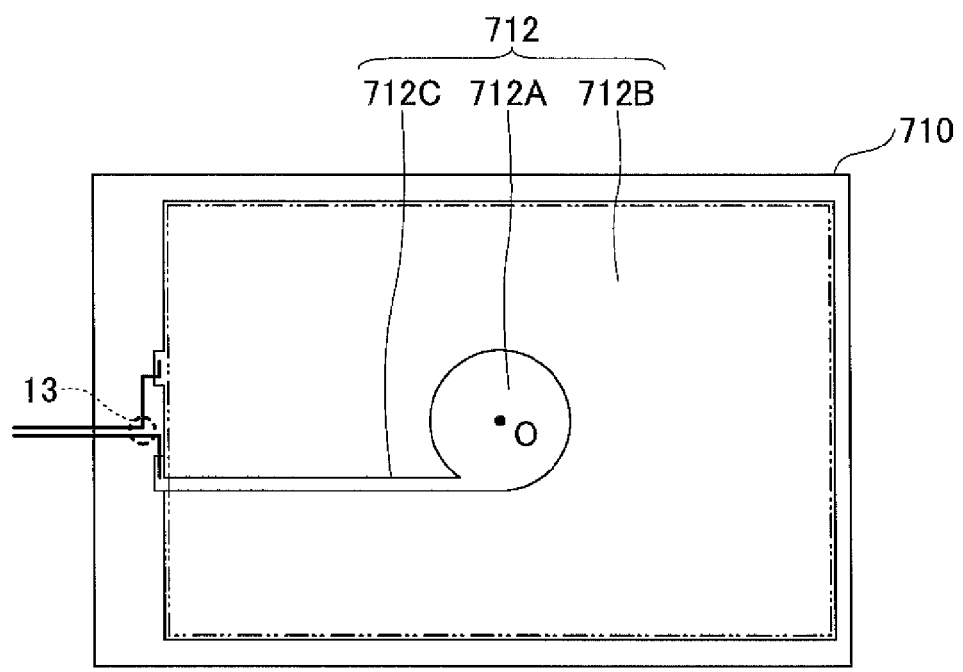
FIG. 15 is a drawing illustrating an upper electrode substrate of a touch panel according to a seventh embodiment.

FIG. 15 is a drawing illustrating an upper electrode substrate 710 of the touch panel according to the seventh embodiment.

A transparent conductive film 712 of the upper electrode substrate 710 has a rectangular shape and includes a center area 712A including a center O of the transparent conductive film 712 and a surrounding area 712B surrounding the center area 712A. The center area 712A is extended by an extension area 712C to the left shorter side of the transparent conductive film 712. The width of the extension area 712C (in a direction that is orthogonal to the extension direction) is preferably about 1 mm. If the width of the extension area 712C is greater than about 1 mm, a contact point may be detected in the extension area 712C. This may reduce the operability in a part of the surrounding area 712B near the extension area 712C. Therefore, the width of the extension area 712C is preferably set at about 1 mm to reduce the sensitivity in the extension area 712C.

The center area 712A (including the extension area 712C) and the surrounding area 712B are connected via the leading electrodes 13 to the flexible substrate 14 and the terminal 15 (see FIG. 5).

The upper electrode substrate 710 of the seventh embodiment is disposed to face the lower electrode substrate 20 (see FIG. 6) of the first embodiment.

The center area 712A and the surrounding area 712B are selected and scanned in sequence in a time division manner. This configuration makes it possible to identify one of the center area 712A and the surrounding area 712B including a contact point and to detect the coordinates of the contact point.

This configuration also makes it possible to separately detect the positions of multiple contact points, where the upper electrode substrate 710 and the lower electrode substrate 20 contact each other, in the respective conductive areas 712A and 712B of the transparent conductive film 712.

In other words, the configuration of the seventh embodiment makes it possible to separately detect multiple points on the upper electrode substrate 710 that are touched or pressed by the user at the same time.

The configuration of the seventh embodiment where the center area 712A is disposed to include the center O of the transparent conductive film 712 allows the user to perform a unique multi-touch input operation. For example, the user touches the center area 712A with a first finger (e.g., thumb), touches the surrounding area 712B with a second finger (e.g., index finger), and pivots the second finger touching the surrounding area 712B around the first finger touching the center area 712A.

The touch panel of the seventh embodiment may be used, for example, for a mobile terminal such as a smartphone. In this case, a display such as a liquid crystal panel may be placed below the areas 712A, 712B, and 712C. For example, data (e.g., a contact list and pictures) stored in a memory of the mobile terminal or data downloaded from a network may be displayed in the areas 712A, 712B, and 712C. This configuration makes it possible to provide a user-friendly touch panel that can separately detect multiple points touched by the user.

Eighth Embodiment

A touch panel 800 according to an eighth embodiment is described below with reference to FIGS. 16 through 20.

Figure 20:
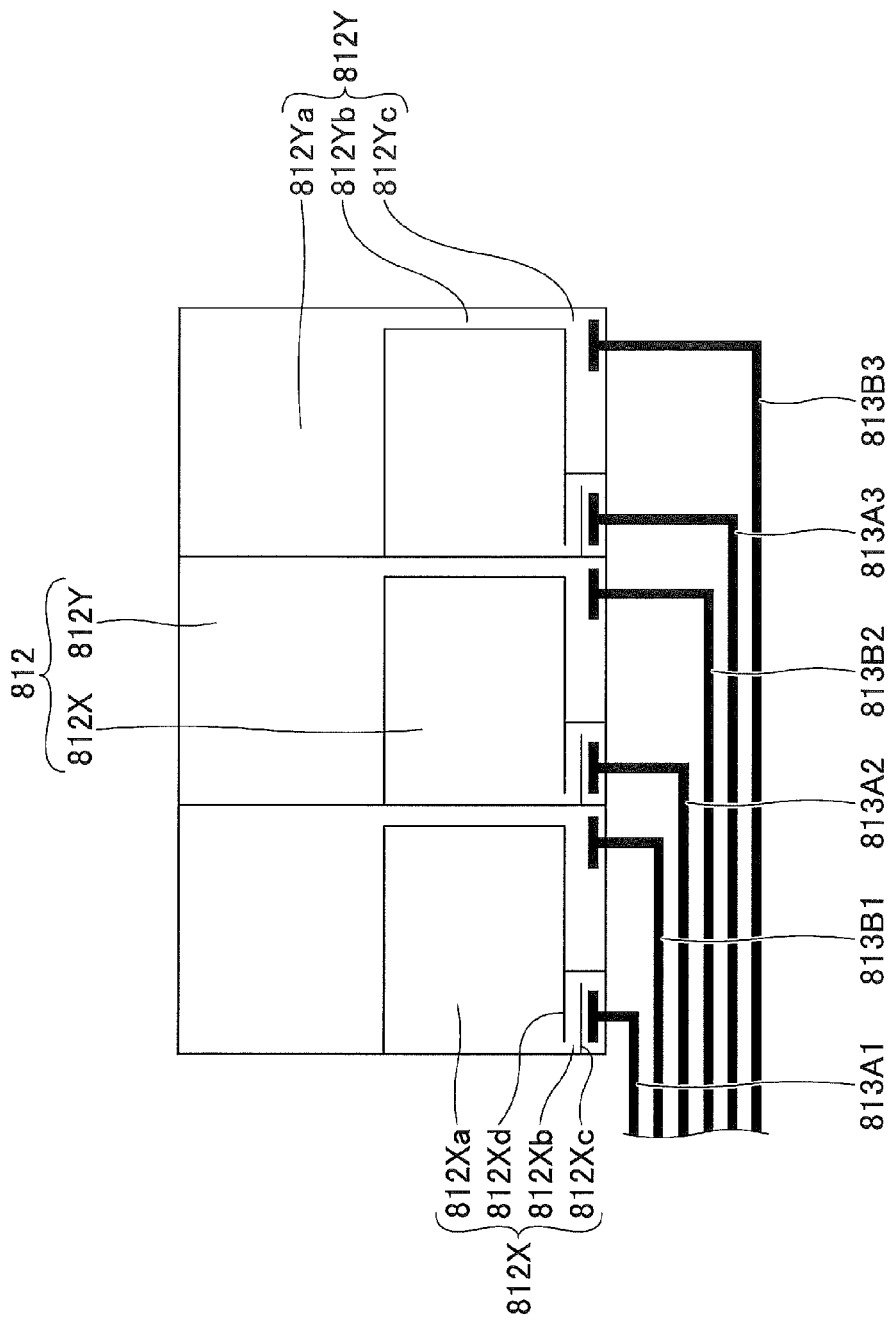
FIG. 20 is a drawing illustrating leading electrodes and a part of a transparent conductive film of an upper electrode substrate of the touch panel according to the eighth embodiment.

The touch panel 800 of the eighth embodiment is different from the touch panels of the first through seventh embodiments in that a transparent conductive film 812 of an upper electrode substrate 810 is divided into conductive areas of four rows and eight columns (see FIG. 16); and the resistance between an outer conductive area 812X and the coordinate detection circuit 50 is substantially the same as the resistance between an inner conductive area 812Y and the coordinate detection circuit 50 (see FIG. 20).

Other components of the touch panel 800 are substantially the same as those of the touch panels of the first through seventh embodiments. Therefore, the same reference numbers are assigned to those components and their descriptions are omitted here.

Figure 18:
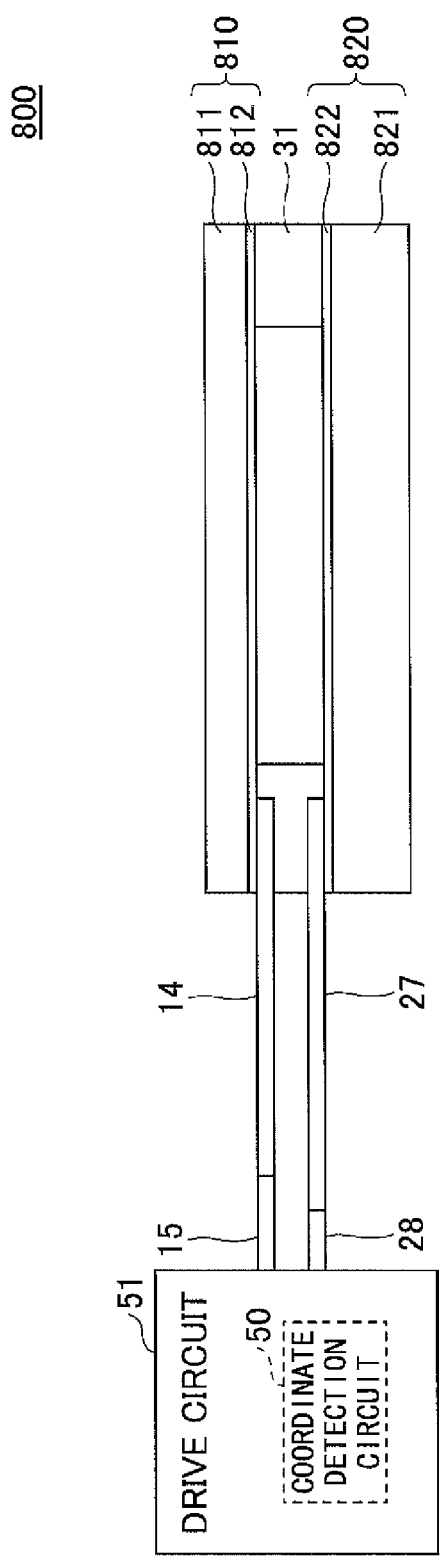
FIG. 18 is a cut-away side view of the touch panel of the eighth embodiment.

As illustrated in FIG. 18, the touch panel 800 includes an upper electrode substrate 810 having a substantially-rectangular shape and including a film 811 and a transparent conductive film 812 formed on a surface of the film 811; and a lower electrode substrate 820 including a glass substrate 821 having substantially the same shape as the upper electrode substrate 810 and a transparent conductive film 822 formed on a surface of the glass substrate 821.

The touch panel 800 also includes the drive circuit 51 including the coordinate detection circuit 50.

The upper electrode substrate 810 and the lower electrode substrate 820 are disposed such that the transparent conductive film 812 and the transparent conductive film 822 face each other, and are joined via a spacer 31 using an adhesive or a double sided tape.

The transparent conductive film 812 of the upper electrode substrate 810 is divided into four areas arranged in the vertical direction (i.e., along the shorter side) and divided into eight areas arranged in the horizontal direction (i.e., along the longer side) to form a total of 32 conductive areas.

Figure 16:
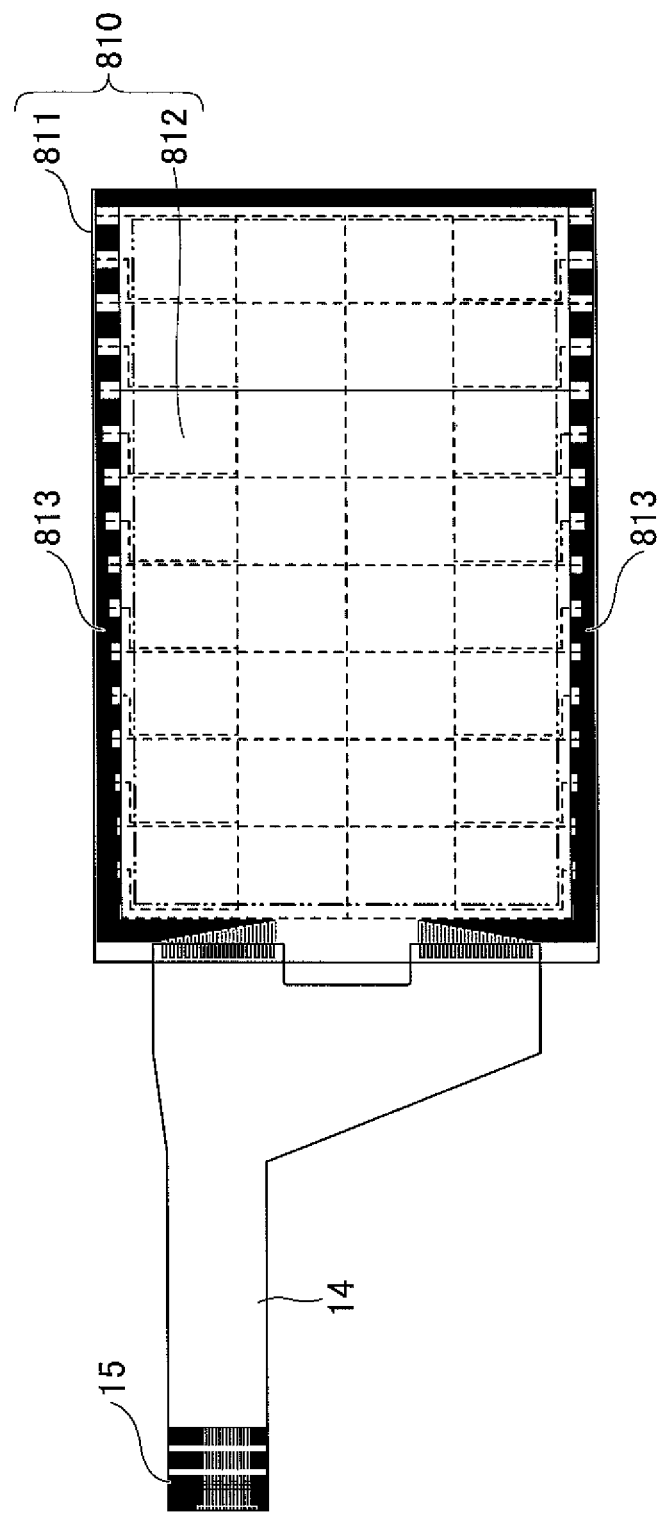
FIG. 16 is a drawing illustrating an exemplary configuration of an upper electrode substrate of a touch panel according to an eighth embodiment.

In FIG. 16, an area indicated by a dashed-two dotted line in the transparent conductive film 812 corresponds to a display area of a display such as a liquid-crystal panel to be placed below the touch panel 800.

The transparent conductive film 812 may be divided into the conductive areas by removing portions of the transparent conductive film 812 between the conductive areas. This configuration makes it possible to electrically insulate the conductive areas from each other. The conductive areas of the transparent conductive film 812 are connected to leading electrodes 813 provided at the ends in the vertical direction of the upper electrode substrate 810 (i.e., along the longer sides of the upper electrode substrate 810). The leading electrodes 813 extend along the sides of the upper electrode substrate 810 and are connected at one of the ends in the horizontal direction of the upper electrode substrate 810 (i.e., at one of the shorter sides of the upper electrode substrate 810) to an end of a flexible substrate 14. A terminal 15 is connected to the other end of the flexible substrate 14. As illustrated in FIG. 18, the terminal 15 is connected to the drive circuit 51 including the coordinate detection circuit 50.

Figure 17:
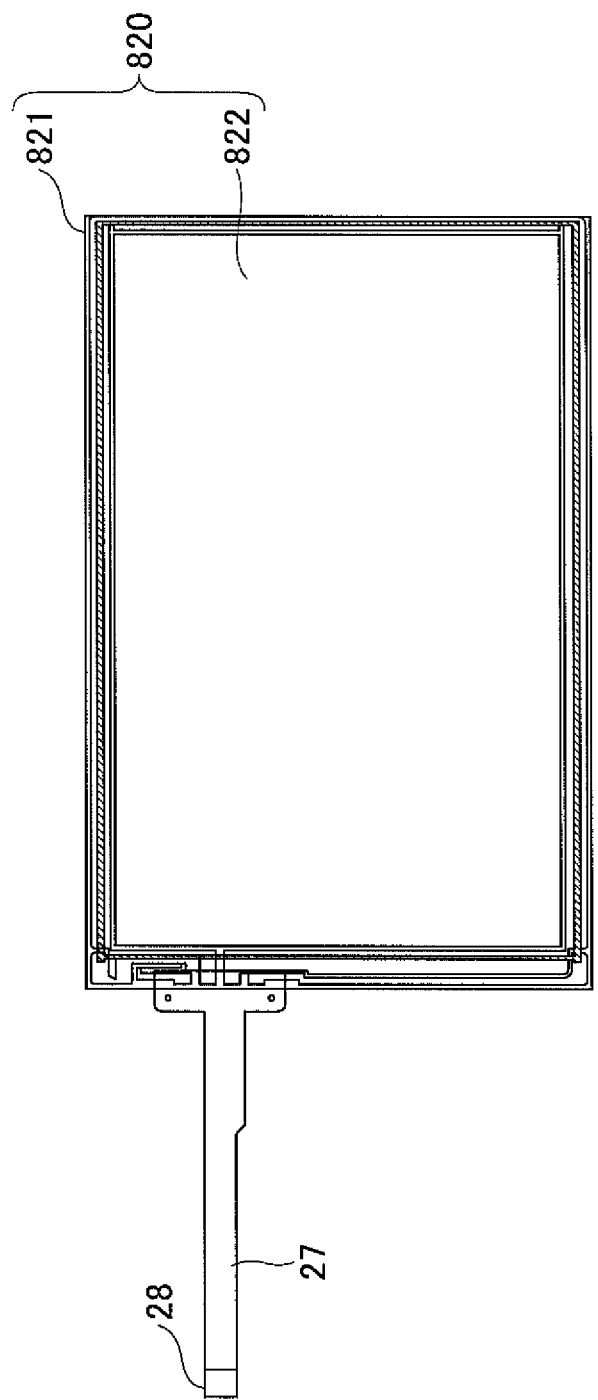
FIG. 17 is a drawing illustrating a lower electrode substrate of the touch panel according to the eighth embodiment.
Figure 19:
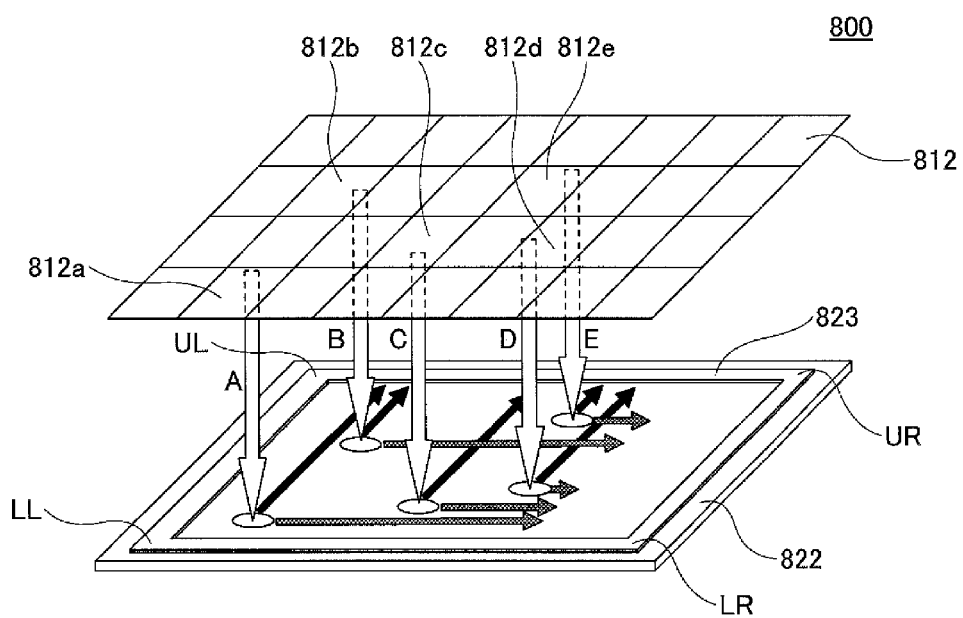
FIG. 19 is a drawing illustrating transparent conductive films of the touch panel of the eighth embodiment.

As illustrated in FIG. 19, an electrode 823 shaped like a rectangular ring is formed on the transparent conductive film 822 along the four edges of the lower electrode substrate 820 (i.e., on the four edges on the transparent conductive film 822). The electrode 823 may be implemented, for example, by a resistive film including Ag or Ag—C. Leads are connected to corners LL, LR, UL, and UR of the electrode 823 to control the electric potentials of the corners LL, LR, UL, and UR (or to generate an electric potential distribution on the transparent conductive film 822). Referring to FIG. 17, the leads extend from the corners LL, LR, UL, and UR along the edges of the lower electrode substrate 820, and are connected at one of the ends in the horizontal direction of the lower electrode substrate 820 (i.e., at one of the shorter sides of the lower electrode substrate 820) to an end of a flexible substrate 27. A terminal 28 is connected to the other end of the flexible substrate 27.

The terminal 15 of the flexible substrate 14 and the terminal 28 of the flexible substrate 27 are connected to the drive circuit 51 that is connected, for example, to a host computer not shown. Examples of materials of the transparent conductive film 812 and the transparent conductive film 822 include indium tin oxide (ITO), a material obtained by adding Al or Ga to zinc oxide (ZnO), and a material obtained by adding Sb to tin oxide ($SnO_2$).

Examples of materials of the film 811 include polyethylene terephthalate (PET), polycarbonate (PC), and a resin material that is transparent in the visible range. The glass substrate 821 may be replaced with a resin substrate.

With the configuration of the touch panel 800 of the eighth embodiment, when a point on the upper electrode substrate 810 is pressed, for example, by a finger, the transparent conductive film 812 of the upper electrode substrate 810 and the transparent conductive film 822 of the lower electrode substrate 820 contact each other at a contact point corresponding to the pressed point. Then, a voltage at the contact point is detected to identify the position of the contact point, i.e., the position of the pressed point on the upper electrode substrate 810. More specifically, according to the eighth embodiment, the conductive areas of the transparent conductive film 812 are scanned in a time division manner so that one of the conductive areas including the contact point can be identified based on the timing when the transparent conductive film 812 and the transparent conductive film 822 contact each other.

Also according to the eighth embodiment, voltages applied by the drive circuit 51 to the corners LL, LR, UL, and UR of the electrode 823 formed on the transparent conductive film 822 are controlled such that voltages are applied alternately in the X-axis and Y-axis directions.

With the configuration where the transparent conductive film 812 of the upper electrode substrate 810 is divided into the conductive areas, the coordinate detection circuit 50 can separately detect the positions of multiple contact points, where the upper electrode substrate 810 and the lower electrode substrate 820 contact each other, in the respective conductive areas.

In the example of FIG. 19, the transparent conductive film 812 of the upper electrode substrate 810 and the transparent conductive film 822 of the lower electrode substrate 820 contact each other at contact points A, B, C, D, and E indicated by arrows A, B, C, D, and E. The contact points A through E are in different conductive areas of the transparent conductive film 812 and therefore can be separately detected. More specifically, in FIG. 19, the contact point A is in a conductive area 812a of the transparent conductive film 812, the contact point B is in a conductive area 812b of the transparent conductive film 812, the contact point C is in a conductive area 812c of the transparent conductive film 812, the contact point D is in a conductive area 812d of the transparent conductive film 812, and the contact point E is in a conductive area 812e of the transparent conductive film 812. Since the conductive areas 812a, 812b, 812c, 812d, and 812e are electrically insulated from each other, the contact points A through E can be separately detected. Thus, the eighth embodiment makes it possible to separately detect multiple contact points (in this example, five contact points) between the transparent conductive film 812 and the transparent conductive film 822 (or between the upper electrode substrate 810 and the lower electrode substrate 820).

In other words, the eighth embodiment makes it possible to identify conductive areas including contact points between the transparent conductive film 812 and the transparent conductive film 822, and also makes it possible to more accurately detect the coordinates of the contact points based on the electric potential distribution of the transparent conductive film 822. Further, the eighth embodiment makes it possible to detect movement of (or changes in the positions of) contact points between the transparent conductive film 812 and the transparent conductive film 822, and makes it possible to detect the coordinates of the moved contact points based on the electric potential distribution of the transparent conductive film 822.

FIG. 20 is a drawing illustrating the leading electrodes 813 (813A1, 813A2, 813A3, 813B1, 813B2, 813B3) and a part of the transparent conductive film 812 of the upper electrode substrate 810 of the touch panel according to the eighth embodiment. For brevity, only 12 conductive areas are illustrated in FIG. 20. However, in the descriptions below, it is assumed that conductive areas are formed in the transparent conductive film 812 as illustrated in FIG. 16.

In FIG. 20, 16 conductive areas located in an outer region of the transparent conductive film 812 in plan view are referred to as conductive areas 812X, and 16 conductive areas located in an inner region of the transparent conductive film 812 in plan view are referred to as conductive areas 812Y.

The conductive areas 812X are adjacent to the longer sides of the upper electrode substrate 810. Meanwhile, the conductive areas 812Y are not adjacent to the longer sides of the upper electrode substrate 810. In other words, the conductive areas 812X are located in an outer region of the transparent conductive film 812 with respect to the leading electrodes 813, and the conductive areas 812Y are located in an inner region of the transparent conductive film 812 with respect to the leading electrodes 813.

For this reason, the conductive area 812Y includes an extension part 812Yb extending from a main part 812Ya to a longer side of the upper electrode substrate 810 and a connection part 812Yc adjacent to the longer side. The extension part 812Yb is formed between two horizontally adjacent conductive areas 812X that are adjacent to the longer side of the upper electrode substrate 810. Therefore, to prevent an error in detecting a contact point, the width of the extension part 812Yb is preferably as small as possible.

Meanwhile, the conductive area 812X includes a main part 812Xa and a roundabout part 812Xb. The roundabout part 812Xb is a connection part for connection with a leading electrode 813A (813A1, 813A2, 813A3), and has a square-bracket shape defined by incisions 812Xc and 812Xd. The roundabout part 812Xb is formed to increase the line length and decrease the line width, and thereby to increase the resistance.

Thus, the transparent conductive film 812 of the touch panel 800 of the eighth embodiment is configured such that the resistance between the outer conductive area 812X and the coordinate detection circuit 50 becomes substantially the same as the resistance between the inner conductive area 812Y and the coordinate detection circuit 50.

Here, since eight conductive areas 812X are arranged along each longer side of the upper electrode substrate 810 as illustrated in FIG. 16, the leading electrodes 813A connecting the conductive areas 812X and the terminal 15 have different lengths. Accordingly, the resistance of the leading electrodes 813A may vary depending on their lengths. If such variation is significant, the resistance of the roundabout part 812Xb of the conductive area 812X may be set at a lower value for a longer leading electrode 813A, and the resistance of the roundabout part 812Xb of the conductive area 812X may be set at a higher value for a shorter leading electrode 813A. This approach makes it possible to offset a difference in resistance resulting from a difference in the length of the leading electrodes 813A.

When the roundabout part 812Xb is not formed, the resistance between the outer conductive area 812X and the coordinate detection circuit 50 differs from the resistance between the inner conductive area 812Y and the coordinate detection circuit 50. For example, if the roundabout part 812Xb is not formed, the resistance between the outer conductive area 812X and the coordinate detection circuit 50 may become smaller than the resistance between the inner conductive area 812Y and the coordinate detection circuit 50 by about several hundreds ohms to about several kilo ohms.

Accordingly, when the roundabout part 812Xb is not formed, the waveform of a signal input from the conductive area 812Y to the coordinate detection circuit 50 becomes less sharp compared with the waveform of a signal input from the conductive area 812X to the coordinate detection circuit 50.

Thus, when the roundabout part 812Xb is not formed, it is necessary to provide separate noise filters in the drive circuit 51 for the conductive areas 812X and the conductive areas 812Y. This results in an increased number of elements in the drive circuit 51.

Meanwhile, according to the eighth embodiment, the transparent conductive film 812 is configured such that the resistance between the outer conductive area 812X and the coordinate detection circuit 50 becomes substantially the same as the resistance between the inner conductive area 812Y and the coordinate detection circuit 50. Thus, the configuration of the eighth embodiment makes it possible to use the same noise filter for the conductive area 812X and the conductive area 812Y, and thereby makes it possible to simplify the configuration of the drive circuit 51.

As described above, in the eighth embodiment, the roundabout part 812Xb is formed to make the resistance between the outer conductive area 812X and the coordinate detection circuit 50 substantially the same as the resistance between the inner conductive area 812Y and the coordinate detection circuit 50.

However, the resistance between the conductive areas 812X and 812Y and the coordinate detection circuit 50 may also be adjusted using a different approach. For example, instead of or in addition to forming the roundabout part 812Xb, the resistance of the leading electrode 813A may be set at a value higher than that of the leading electrode 813B (813B1, 813B2, 813B3) so that the resistance between the outer conductive area 812X and the coordinate detection circuit 50 becomes substantially the same as the resistance between the inner conductive area 812Y and the coordinate detection circuit 50.

The leading electrodes 813A and 813B may be printed, for example, using a silver paste. In this case, the leading electrodes 813A and 813B may be printed in separate printing processes using a silver paste having a higher resistance for the leading electrodes 813A and a silver paste having a lower resistance for the leading electrodes 813B.

Also, if the resistance of the leading electrodes 813A varies significantly depending on their lengths, a silver paste with a lower resistance may be used for a longer leading electrode 813A and a silver paste with a higher resistance may be used for a shorter leading electrode 813A.

The resistance of the leading electrodes 813B connected to the conductive areas 812Y may also be adjusted in a similar manner.

Figure 21:
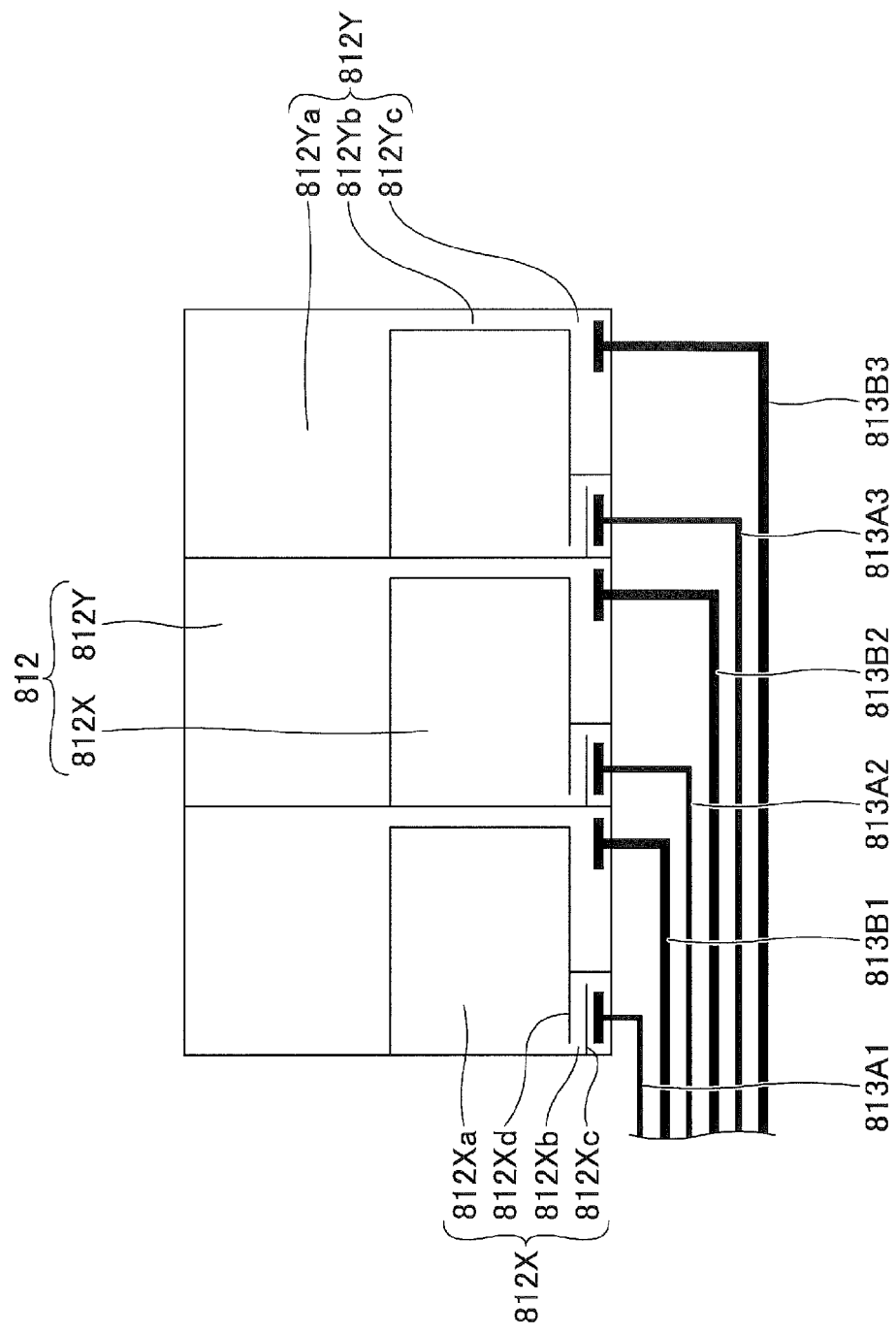
FIG. 21 is a drawing illustrating leading electrodes and a part of a transparent conductive film of an upper electrode substrate according to a first variation of the eighth embodiment.

Also, as illustrated in FIG. 21, instead of or in addition to forming the roundabout part 812Xb, the resistance between the conductive areas 812X and 812Y and the coordinate detection circuit 50 may be adjusted by making the width of the leading electrodes 813A connected to the conductive areas 812X less than the width of the leading electrodes 813B connected to the conductive areas 812Y.

For example, the width of the leading electrode 813A may be made less than the width of the leading electrode 813B such that the resistance between the outer conductive area 812X and the coordinate detection circuit 50 becomes substantially the same as the resistance between the inner conductive area 812Y and the coordinate detection circuit 50 without forming the roundabout part 812Xb.

Also in this case, if the resistance of the leading electrodes 813A varies significantly depending on their lengths, the width of a longer leading electrode 813A may be made greater than the width of a shorter leading electrode 813A.

The resistance of the leading electrodes 813B connected to the conductive areas 812Y may also be adjusted in a similar manner.

Figure 22:
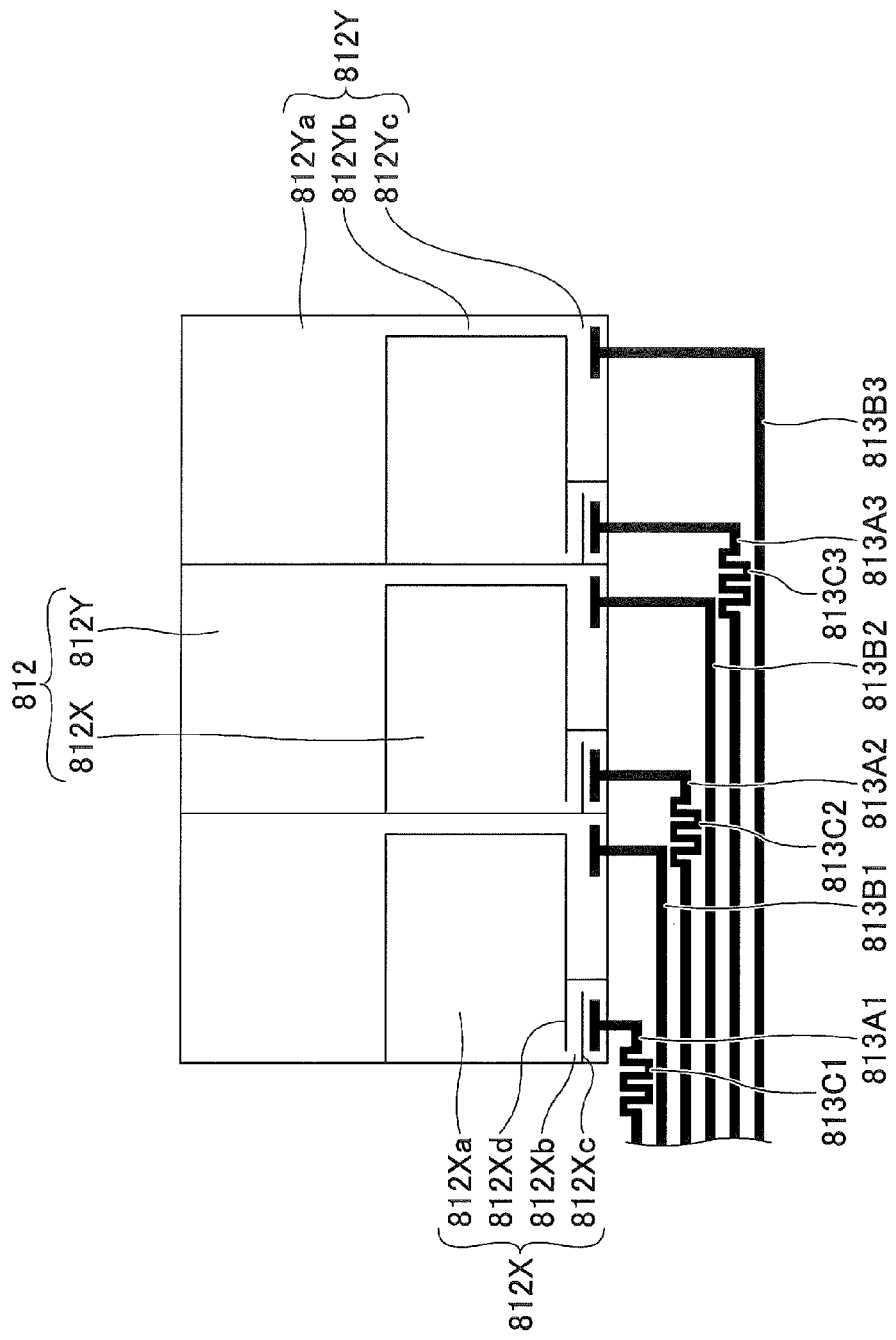
FIG. 22 is a drawing illustrating leading electrodes and a part of a transparent conductive film of an upper electrode substrate according to a second variation of the eighth embodiment.

Also, as illustrated in FIG. 22, instead of or in addition to forming the roundabout part 812Xb, the resistance between the conductive area 812X and the coordinate detection circuit 50 may be adjusted by inserting a roundabout part 813C (813C1, 813C2, 813C3) in the leading electrode 813A.

For example, the roundabout part 813C may be inserted in the leading electrode 813A such that the resistance between the outer conductive areas 812X and the coordinate detection circuit 50 becomes substantially the same as the resistance between the inner conductive areas 812Y and the coordinate detection circuit 50 without forming the roundabout part 812Xb.

Also in this case, if the resistance of the leading electrodes 813A varies significantly depending on their lengths, a roundabout part 813C with a lower resistance may be inserted in a longer leading electrode 813A and a roundabout part 813C with a higher resistance may be inserted in a shorter leading electrode 813A.

The resistance of the leading electrodes 813B connected to the conductive areas 812Y may also be adjusted in a similar manner.

Figure 23A:
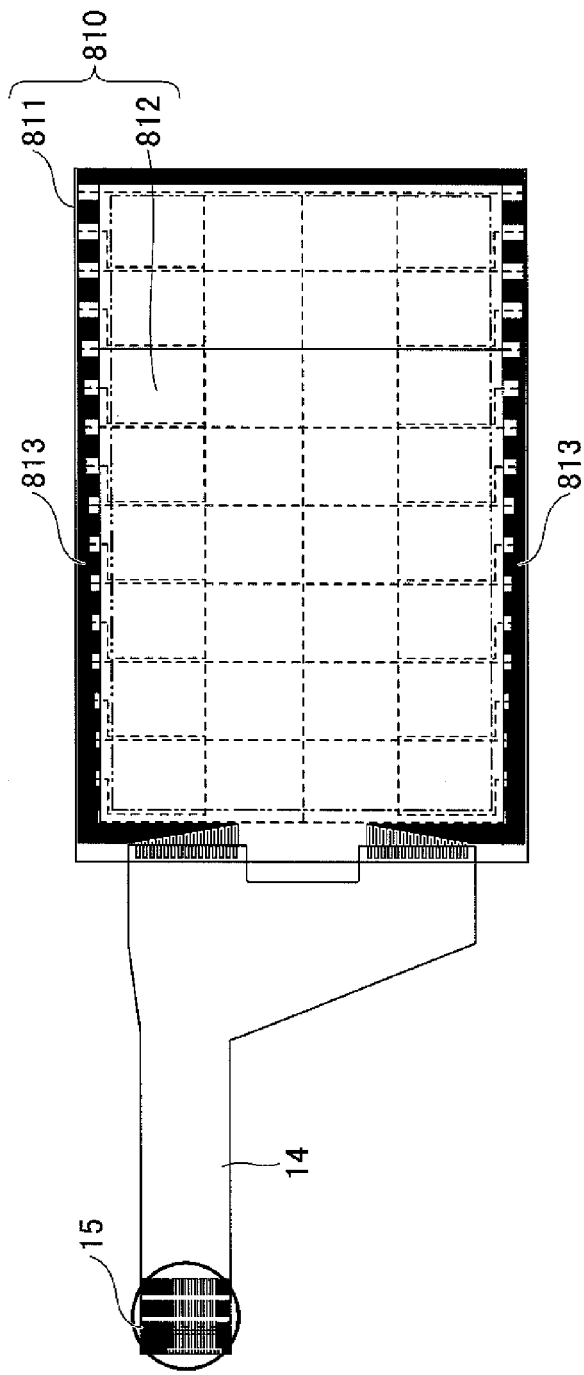
FIGS. 23A and 23B are drawings illustrating a transparent conductive film of an upper electrode substrate and a terminal according to a third variation of the eighth embodiment.
Figure 23B:
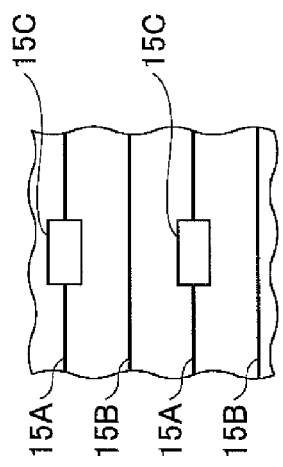

Further, as illustrated in FIGS. 23A and 23B, the resistance may be adjusted by inserting resistors in wiring of the terminal 15. FIG. 23A illustrates the upper electrode substrate 810 and FIG. 23B is an enlarged view of the terminal 15.

As illustrated in FIG. 23B, the terminal 15 includes wires 15A and wires 15B. The wires 15A are connected to the conductive areas 812X and the wires 15B are connected to the conductive areas 812Y. Resistors 15C for adjusting resistance are inserted in the wires 15A.

The resistors 15C may be inserted in the wires 15A of the terminal 15 instead of or in addition to forming the roundabout part 812Xb.

For example, the resistors 15C may be inserted in the wiring of the terminal 15 such that the resistance between the outer conductive areas 812X and the coordinate detection circuit 50 becomes substantially the same as the resistance between the inner conductive areas 812Y and the coordinate detection circuit 50 without forming the roundabout part 812Xb.

Also in this case, if the resistance of the leading electrodes 813A varies significantly depending on their lengths, a resistor 15C with a lower resistance may be used for a longer leading electrode 813A and a resistor 15C with a higher resistance may be used for a shorter leading electrode 813A.

The resistance of the leading electrodes 813B connected to the conductive areas 812Y may also be adjusted in a similar manner.

Instead of inserting the resistors 15C in the wiring of the terminal 15, the resistors 15C may be inserted in the coordinate detection circuit 50 to adjust the resistance.

Ninth Embodiment

Figure 24A:
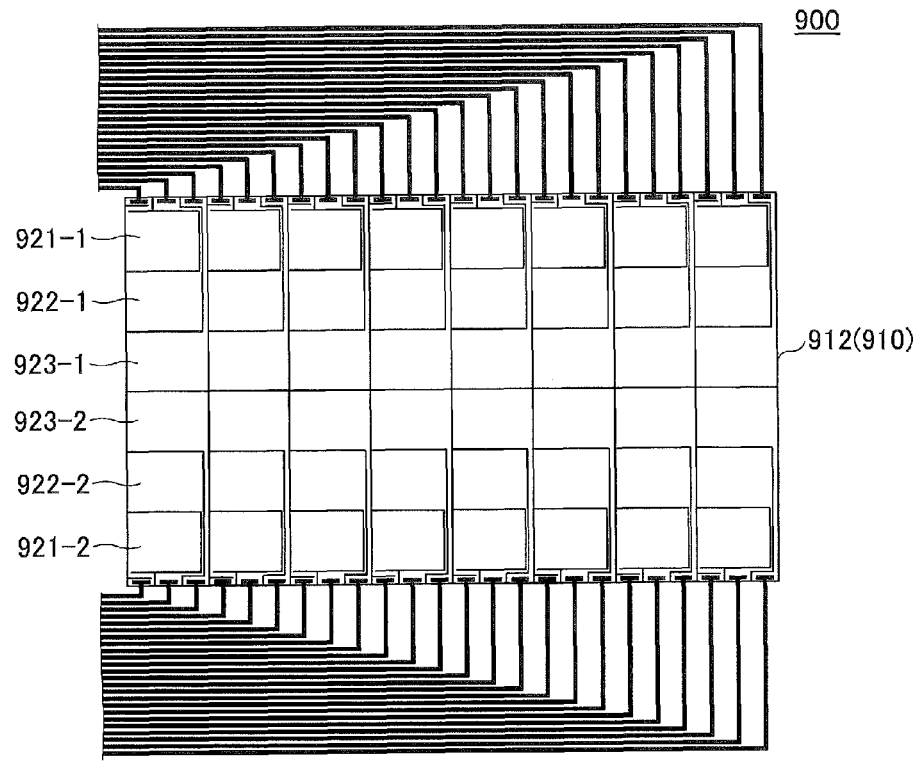
FIGS. 24A and 24B are drawings illustrating conductive areas formed in a transparent conductive film of an upper electrode substrate of a touch panel according to a ninth embodiment.
Figure 24B:
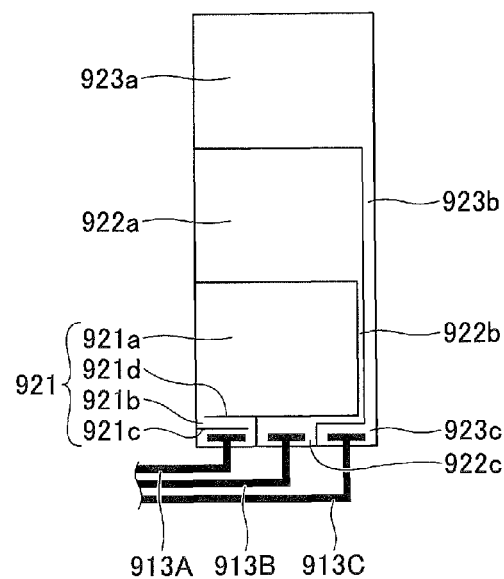

FIGS. 24A and 24B are drawings illustrating conductive areas 921 (921-1, 921-2), 922 (922-1, 922-2), and 923 (923-1, 923-2) formed in a transparent conductive film 912 of an upper electrode substrate 910 of a touch panel 900 according to a ninth embodiment.

As illustrated in FIGS. 24A and 24B, 6×8=48 conductive areas 921, 922, and 923 are formed in the transparent conductive film 912 of the upper electrode substrate 910 of the touch panel 900 of the ninth embodiment. In FIG. 24A, leading electrodes 913 are enlarged for illustration purposes. In practice, however, the leading electrodes 913 are formed in a narrow area around the transparent conductive film 912 in a manner similar to the leading electrodes 813 of FIG. 23A.

In FIG. 24A, the transparent conductive film 912 is divided into 16 conductive areas 921 (921-1, 921-2) located in an outer region of the transparent conductive film 912 in plan view, 16 conductive areas 922 (922-1, 922-2) located in an inner region of the transparent conductive film 912 in plan view, and 16 conductive areas 923 (923-1, 923-2) located in an inner region of the transparent conductive film 912 in plan view. The conductive areas 923 are located further inside of the transparent conductive film 912 than the conductive areas 922.

The conductive areas 921 are adjacent to the longer sides of the upper electrode substrate 910. Meanwhile, the conductive areas 922 and 933 are not adjacent to the longer sides of the upper electrode substrate 910. In other words, the conductive areas 921 are located in an outermost region of the transparent conductive film 912 with respect to the leading electrodes 913, the conductive areas 923 are located in an innermost region of the transparent conductive film 912 with respect to the leading electrodes 913, and the conductive areas 922 are located between the conductive areas 921 and the conductive areas 923.

For this reason, the conductive area 922 includes an extension part 922b extending from a main part 922a to a longer side of the upper electrode substrate 910 and a connection part 922c adjacent to the longer side. To prevent an error in detecting a contact point, the width of the extension part 922b is preferably as small as possible.

Similarly, the conductive area 923 includes an extension part 923b extending from a main part 923a to a longer side of the upper electrode substrate 910 and a connection part 923c adjacent to the longer side.

The width of the extension part 923b is also preferably as small as possible to prevent an error in detecting a contact point. In the ninth embodiment, however, the width of the extension part 923b is greater than the width of the extension part 922b. This is to make the resistance between the conductive area 923 and the coordinate detection circuit 50 substantially the same as the resistance between the conductive area 922 and the coordinate detection circuit 50.

Meanwhile, the conductive area 921 includes a main part 921a and a roundabout part 921b. The roundabout part 921b is a connection part for connection with a leading electrode 913A, and has a square-bracket shape defined by incisions 921c and 921d. The roundabout part 921b is formed to increase the line length and decrease the line width, and thereby to increase the resistance.

The resistance of the roundabout part 921b is set to equal the combined resistance of the extension part 922b and the connection part 922c and the combined resistance of the extension part 923b and the connection part 923c.

Thus, the transparent conductive film 912 of the touch panel 900 of the ninth embodiment is configured such that the resistance between the outermost conductive area 921 and the coordinate detection circuit 50, the resistance between the inner conductive area 922 and the coordinate detection circuit 50, and the resistance between the innermost conductive area 923 and the coordinate detection circuit 50 become substantially the same.

The above configuration of the ninth embodiment makes it possible to use, for example, the same noise filter for the conductive areas 921, 922, and 923 and thereby makes it possible to simplify the configuration of the drive circuit 51.

Here, since eight conductive areas 921 are arranged along each longer side of the upper electrode substrate 912 as illustrated in FIG. 24A, the leading electrodes 913A connecting the conductive areas 921 and the terminal 15 have different lengths. Accordingly, the resistance of the leading electrodes 913A may vary depending on their lengths. If such variation is significant, the resistance of the roundabout part 921b of the conductive area 921 may be set at a lower value for a longer leading electrode 913A, and the resistance of the roundabout part 921b of the conductive area 921 may be set at a higher value for a shorter leading electrode 913A.

The resistance of the leading electrodes 913B and 913B connected to the conductive areas 922 and 923 may also be adjusted in a similar manner.

Also, instead of or in addition to adjusting the resistance of the roundabout part 921b, the extension part 922b, the connection part 922c, the extension part 923b, and the connection part 923c as described above, the resistance between the conductive areas 921, 922, and 923 and the coordinate detection circuit 50 may be adjusted by adjusting the resistance of a silver paste used for the leading electrodes 913A, 913B, and 913C or by adjusting the widths or lengths of the leading electrodes 913A, 913B, and 913C as described in the eighth embodiment.

Further, the resistance may be adjusted by inserting resistors in the terminal 15 or the coordinate detection circuit 50.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A touch panel, comprising:
a first electrode substrate including a first substrate and a first conductive film formed on the first substrate, the first conductive film being divided into plural conductive areas including a first conductive area located in an outer region of the first conductive film and a second conductive area located in an inner region of the first conductive film relative to the first conductive area;
a second electrode substrate including a second substrate and a second conductive film formed on the second substrate to face the first conductive film;
a coordinate detection circuit connected to the conductive areas and configured to detect coordinates of a point in any one of the conductive areas which has contacted the second conductive film; and
leading electrodes formed on the first substrate and configured to connect the conductive areas to the coordinate detection circuit, the leading electrodes including a first leading electrode connected to the first conductive area and a second leading electrode connected to the second conductive area, wherein
the leading electrodes are made of a metal; and
the first leading electrode includes a roundabout part to make a resistance of the first leading electrode higher than a resistance of the second leading electrode.

2. The touch panel as claimed in claim 1, wherein a width of the first leading electrode is less than a width of the second leading electrode.

3. The touch panel as claimed in claim 1, further comprising:
a resistor inserted between the first leading electrode connected to the first conductive area and the coordinate detection circuit.

4. The touch panel as claimed in claim 1, wherein
the conductive areas include a third conductive area located further inside of the first conductive film than the second conductive area;
the leading electrodes include a third leading electrode connected to the third conductive area; and
the resistance of the second leading electrode is higher than a resistance of the third leading electrode.

5. The touch panel as claimed in claim 4, further comprising:
a first resistor inserted between the first leading electrode connected to the first conductive area and the coordinate detection circuit; and
a second resistor inserted between the second leading electrode connected to the second conductive area and the coordinate detection circuit,
wherein the first resistor and the second resistor are configured such that a resistance between the first conductive area and the coordinate detection circuit, a resistance between the second conductive area and the coordinate detection circuit, and a resistance between the third conductive area and the coordinate detection circuit become substantially the same.

6. A touch panel, comprising:
a first electrode substrate including a first substrate and a first conductive film formed on the first substrate, the first conductive film being divided into plural conductive areas including a first conductive area and a second conductive area;

a second electrode substrate including a second substrate and a second conductive film formed on the second substrate to face the first conductive film;

a coordinate detection circuit connected to the conductive areas and configured to detect coordinates of a point in any one of the conductive areas which has contacted the second conductive film; and leading electrodes formed on the first substrate and configured to connect the conductive areas to the coordinate detection circuit, each of the leading electrodes being connected to a corresponding conductive area at a conductive region formed on the first conductive film, wherein the leading electrodes are made of a metal, and include a second leading electrode and a first leading electrode that is relatively shorter than the second leading electrode, and a width of the conductive region connected to the first leading electrode is made smaller than a width of the conductive region connected to the second leading electrode to make a resistance value of the conductive region connected to the first leading electrode relatively higher than a resistance value of the conductive region connected to the second leading electrode.

* * * * *